(12) United States Patent
Hever et al.

(10) Patent No.: US 11,943,570 B2
(45) Date of Patent: Mar. 26, 2024

(54) IMAGED TARGET DETECTION VERIFICATION

(71) Applicant: UVeye Ltd., Tel Aviv (IL)

(72) Inventors: Amir Hever, Tel-Aviv (IL); Ohad Hever, Modiin (IL); Ilya Bogomolny, Tel-Aviv (IL)

(73) Assignee: UVEYE LTD., Tel Aviv (IL)

( * ) Notice: Subject to any disclaimer, the term of this patent is extended or adjusted under 35 U.S.C. 154(b) by 605 days.

(21) Appl. No.: 17/111,051

(22) Filed: Dec. 3, 2020

(65) Prior Publication Data

US 2021/0174117 A1 Jun. 10, 2021

Related U.S. Application Data

(60) Provisional application No. 62/945,904, filed on Dec. 10, 2019.

(51) Int. Cl.

| | |
|---|---|
| *H04N 7/18* | (2006.01) |
| *G06F 18/24* | (2023.01) |
| *G06F 18/25* | (2023.01) |
| *G06T 7/00* | (2017.01) |
| *G06T 7/60* | (2017.01) |
| *G06T 7/70* | (2017.01) |
| *G06V 10/25* | (2022.01) |
| *G06V 20/52* | (2022.01) |
| *H04N 23/695* | (2023.01) |

(52) U.S. Cl.
CPC ............ *H04N 7/188* (2013.01); *G06F 18/24* (2023.01); *G06F 18/25* (2023.01); *G06T 7/001* (2013.01); *G06T 7/60* (2013.01); *G06T 7/70* (2017.01); *G06V 10/25* (2022.01); *G06V 20/52* (2022.01); *G06T 2207/10028* (2013.01); *G06T 2207/20084* (2013.01); *G06T 2207/30244* (2013.01); *G06T 2207/30248* (2013.01); *G06V 2201/07* (2022.01); *G06V 2201/08* (2022.01); *H04N 23/695* (2023.01)

(58) Field of Classification Search
CPC .......... H04N 7/188; G06T 7/70; G06V 10/25; G06V 20/52; G06F 18/25; G06F 18/24
See application file for complete search history.

(56) References Cited

U.S. PATENT DOCUMENTS

| | | | |
|---|---|---|---|
| 11,087,292 B2 * | 8/2021 | Utke | G06V 10/764 |
| 2020/0236343 A1 * | 7/2020 | Holzer | G06T 15/10 |

* cited by examiner

*Primary Examiner* — David Perlman
(74) *Attorney, Agent, or Firm* — Browdy and Neimark, PLLC

(57) ABSTRACT

A system configured for verification of imaged target detection performs the following: (a) receive information indicative of at least two images of object(s). This information comprises candidate target detection region(s), indicative of possible detection of a target associated with the object(s). Images have at least partial overlap. The candidate region(s) appears at least partially in the overlap area. The images are associated with different relative positions of capturing imaging device(s) and of an imaged portion of the object(s). (b) process the information to determine whether the candidate region(s) meets a detection repetition criterion, the criterion indicative of repetition of candidate region(s) in locations of the images that are associated with a same location on a data representation of the object(s). (c) if the criterion is met, classify the candidate region(s) as verified target detection region(s). This facilitates output of an indication of the verified region(s).

38 Claims, 14 Drawing Sheets

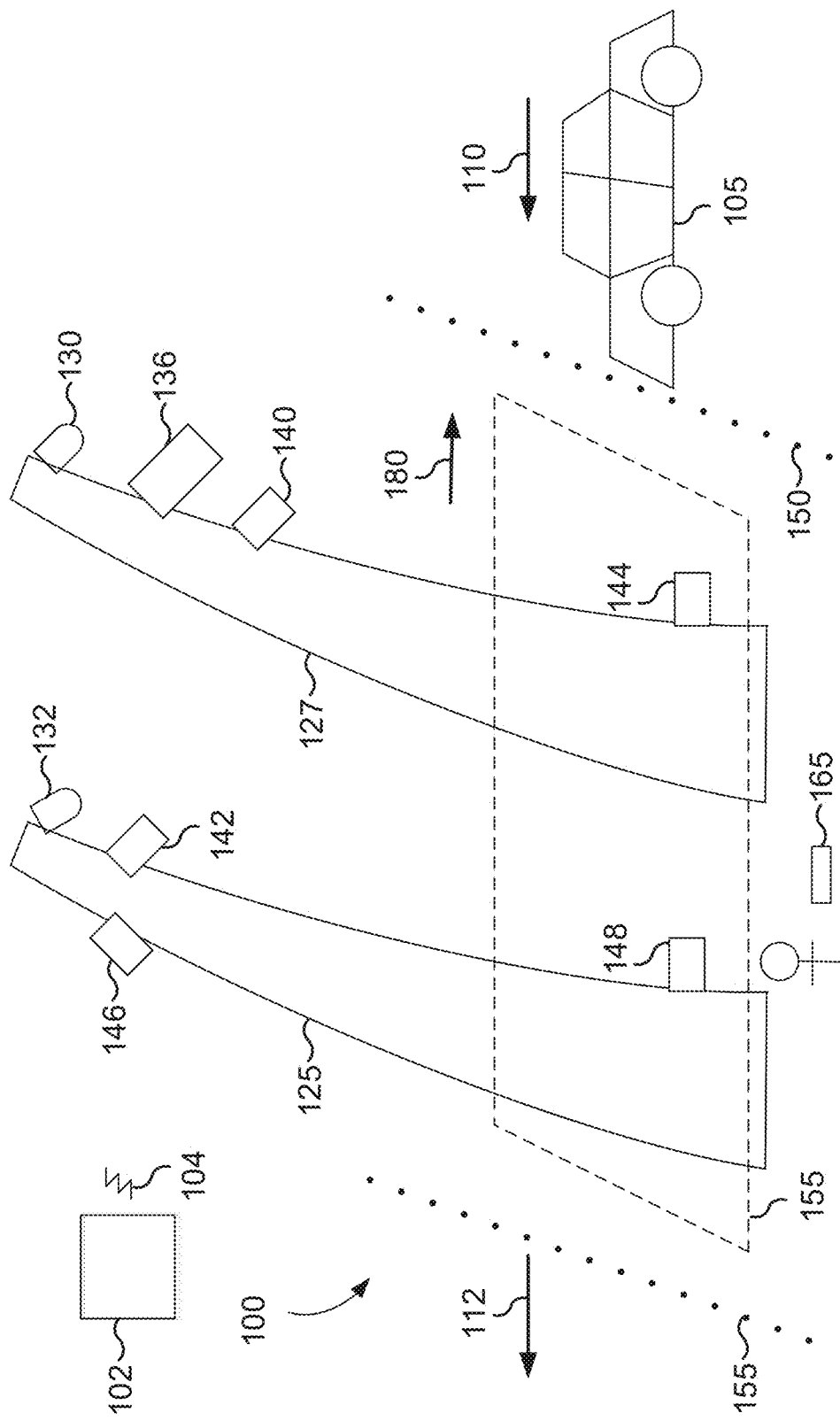

IMAGED TARGET DETECTION VERIFICATION

TECHNICAL FIELD

The presently disclosed subject matter relates to target detection using imaging.

BACKGROUND

Vehicles such as automobiles and similar objects, can be damaged during manufacture, packing, transportation, sale etc. Inspection is in some cases carried out to detect damage such as scratches and dents, and other abnormalities and anomalies. If a thorough and accurate inspection is not done, for example at all stages of shipping a vehicle, it may be difficult to ascertain at what stage damage to the product of different types occurred. Also, it is typically desirable that a damaged vehicle or other object or product not be sold to a consumer. In other examples, it is desirable to detect another target of interest on the image of an object, for example a label or the signature of a designer.

GENERAL DESCRIPTION

According to a first aspect of the presently disclosed subject matter there is presented a system configured for verification of imaged target detection, comprising a processing circuitry and configured to perform the following:
  (a) receive information indicative of at least two images of at least one object, wherein the information indicative of the at least two images comprises at least one candidate target detection region, the at least one candidate target detection region indicative of possible detection of a target of interest associated with the at least one object, wherein the at least two images having at least partial overlap, constituting an overlap area, wherein the at least one target detection region appears at least partially in the overlap area,
    wherein the at least two images are associated with different relative positions of at least one capturing imaging device associated with the at least two images and of an imaged portion of the object associated with the at least two images; and
  (b) process the information indicative of the at least two images to determine whether the at least one candidate target detection region meets at least one detection repetition criterion, the at least one detection repetition criterion being indicative of repetition of the at least one candidate target detection region in locations of the at least two images that are associated with a same location on a data representation of the at least one object;
  (c) in response to the at least one detection repetition criterion being met, classify the at least one candidate target detection region as at least one verified target detection region.
  thereby facilitating output of an indication of the at least one verified target detection region.

In addition to the above features, the system according to this aspect of the presently disclosed subject matter can include one or more of features (i) to (xliv) listed below, in any desired combination or permutation which is technically possible:
  (i) the information indicative of the at least two images comprises at least one of: information indicative of a time of capture of each image of the at least two images; information indicative of the at least one capturing imaging device associated with each image of the at least two images; relative positions of the at least one candidate target detection region on each image of the at least two images.
  (ii) the at least two images comprises three images.
  (iii) the at least one detection repetition criterion comprises the at least one candidate target detection region appearing in all images of the at least two images.
  (iv) the at least one detection repetition criterion comprises a temporal detection repetition criterion, wherein the different imaging positions of the at least one capturing imaging device and of the imaged portion of the object are associated at least partially with images captured at different times.
  (v) the images captured at different times are temporally-consecutive captured images.
  (vi) the temporal detection repetition criterion is indicative of at least one motion map.
  (vii) the motion map is associated with the capture of the at least two images.
  (viii) the step (b) comprises:
    i. determine positions of a portion of the data representation of the at least one object associated with the at least two images and the different relative positions of the at least one capturing imaging device associated with the at least two images and the imaged portion of the object associated with the at least two images, based at least on the information indicative of the capturing imaging device associated with each image of the at least two images, positions of the at least one capturing imaging device; orientations of the at least one capturing imaging device and the at least one motion map;
    ii. determining at least one first relative position of the at least one candidate target detection region with respect to a position of the portion of the data representation of the at least one object associated with the first image;
    iii. determine at least one expected relative position of at least one expected corresponding candidate target detection region on other images of the at least two images, the other images not comprising the first image, wherein the determination is based on at least the positions of the portion of the data representation of the at least one object associated with the at least two images, the different relative positions of the at least one capturing imaging device associated with the at least two images and the imaged portion of the object associated with the at least two images, the at least one first relative position of the at least one candidate target detection region and the at least one motion map; and
    iv. determining whether the at least one expected corresponding candidate target detection region appears on other images of the at least two images at the at least one expected relative position.
  (ix) the at least one detection repetition criterion comprises a spatial detection repetition criterion, wherein the different relative positions of the at least one capturing imaging device and of the imaged portion of the object being associated at least partially with images captured by different capturing imaging devices.
  (x) the spatial detection repetition criterion is indicative of at least one geometric map.
  (xi) the least one geometric map is based at least on a CAD model point cloud.
  (xii) each geometric map of the least one geometric map is associated with a time of image capture.

(xiii) the different capturing imaging devices are configured to capture images substantially synchronously.

(xiv) the different capturing imaging devices have known imaging device relative positions and known relative imaging device imaging angles.

(xv) the step (b) comprises:
i. transform the coordinates of a first candidate detection region, associated with a first image frame captured by a first imaging device, where the coordinates of the first candidate detection region are in the coordinate system of a first imaging device, using a known calibration of the two devices and the geometric map, to the coordinate system of a second imaging device,
ii. compare the transformed coordinates of the first candidate detection region to the coordinates of a second candidate detection region associated with a second image frame captured by the second imaging device.
iii. determine whether coordinates of a second candidate detection region match the transformed coordinates of the first candidate detection region, within a defined tolerance.

(xvi) in the steps (b) and (c), the temporal detection repetition criterion constitutes the at least one detection repetition criterion, the method further comprising:
   (d) setting the at least one verified target detection region to constitute the at least one candidate target detection region; and
   (e) repeating said steps (b) and (c), wherein the spatial detection repetition criterion constitutes the at least one detection repetition criterion,
thereby generating a doubly-verified target detection region.

(xvii) the information indicative of the at least two images comprises the at least two images.

(xviii) the information indicative of at the least two images comprises an indication that at least one image of the at least two images is not associated with any candidate target detection region of the at least one candidate target detection region.

(xix) the method further comprising performing, after said step (c), the following:
   (f) in response to classifying the at least one candidate target detection region as at least one verified target detection region, outputting the indication of the at least one verified target detection region.

(xx) the indication comprises at least one of coordinates associated with the at least one verified target detection region, the coordinates being associated with one of the data representations of the at least one object and an image of the at least two images.

(xxi) the indication of the at least one verified target detection region comprises at least one output image comprising the at least one verified target detection region, wherein the at least one verified target detection region is indicated on the at least one output image.

(xxii) in step (a), the receiving the information indicative of at least two images, comprises receiving from a target detection system.

(xxiii) the target detection system is a single-frame target detection system.

(xxiv) the single-frame target detection system comprising a single input.

(xxv) the single-frame target detection system comprises multiple inputs.

(xxvi) the target detection system utilizes a neural network.

(xxvii) the method further comprising, performing, prior to said step (a), the following:
   (g) detecting, by the target detection system, the at least one candidate target detection region.

(xxviii) the at least one capturing imaging device comprised in an image acquisition system.

(xxix) the at least one capturing imaging device comprises a camera.

(xxx) the at least one object moving during capture of the at least two images.

(xxxi) a path movement of the at least one object is unconstrained.

(xxxii) the at least one capturing imaging device moving during capture of the at least two images.

(xxxiii) the at least one imaging device and the at least one lighting source are mounted in a structure.

(xxxiv) the method further comprising, performing, prior to said step (g), the following:
   (h) capturing the at least two images by the at least one capturing imaging device.

(xxxv) the capturing of the at least two images performed in response to detection by a triggering system of an image capture trigger condition, the triggering system comprising at least one monitoring imaging device,
wherein detection of the image capture trigger condition being performed in response to capture of at least one monitoring image by the at least one monitoring imaging device,
wherein the image capture trigger condition comprises the object meeting a location condition.

(xxxvi) the triggering system is configured to distinguish between the at least one object and other objects.

(xxxvii) the other objects comprise at least one of people, animals and tools.

(xxxviii) the location condition comprises the object entering an image capture region, the image capture region having a defined positional relationship with the image acquisition system.

(xxxix) the image capture region having a rectangular shape.

(xl) the location condition comprises the object crosses a defined line, the defined line having a defined positional relationship with the image acquisition system.

(xli) the at least one capturing imaging device of the image acquisition system comprises the at least one monitoring imaging device.

(xlii) in response to the at least one candidate target detection region being indicative of a reflection of light from the object, in said step (b) the at least one candidate target detection region does not meet the at least one detection repetition criterion.

(xliii) The at least two images comprising still images.

(xliv) the at least two images comprising images of a video recording.

According to a second first aspect of the presently disclosed subject matter there is presented a system configured for verification of imaged target detection, comprising a processing circuitry and configured to perform the following:
   (a) receive information indicative of at least two images of at least one object, wherein the information indicative of the at least two images comprises at least one candidate target detection region, the at least one candidate target detection region indicative of possible detection of a target of interest associated with the at least one object, wherein the at least two images having at least partial overlap, constituting an overlap area, wherein the at least one target detection region appearing at least partially in the overlap area,
wherein the at least two images are associated with different relative positions of at least one capturing imaging device associated with the at least two images and of an imaged portion of the object associated with the at least two images; and
(b) process the information indicative of the at least two images to determine whether the at least one candidate target detection region meets at least one detection non-repetition criterion, the at least one detection non-repetition criterion being indicative of repetition of the at least one candidate target detection region in locations of the at least two images that are associated with different locations on a data representation of the at least one object;
(c) in response to the at least one detection non-repetition criterion being met, classify the at least one candidate target detection region as at least one non-verified target detection region.

This aspect of the disclosed subject matter can optionally include one or more of features (i) to (xliv) listed above, mutatis mutandis, in any desired combination or permutation which is technically possible.

According to a third aspect of the presently disclosed subject matter there is presented a multiple-image-input single-frame imaged target detection system, comprising a processing circuitry and configured to perform the following:
1) receive, via at least two image inputs of the multiple-image-input single-frame imaged target detection system, at least two images of at least one object, wherein the at least two images having at least partial overlap, wherein the at least two images being associated with different relative positions of at least one capturing imaging device associated with the at least two images and an imaged portion of the object associated with the at least two images; and
2) process the at least two images, to detect at least one candidate target detection region, the at least one candidate target detection region indicative of detection of a target of interest associated with the at least one object,
wherein the at least one candidate target detection region associated with a detection image of the at least two images,
wherein the at least one candidate target detection region appearing at least partially in an area of the detection image that is associated with the at least partial overlap,
thereby enabling a higher detection accuracy associated with detection of the at least one candidate target detection region as compared to a lower detection accuracy associated with detection of candidate target detection regions by a single-image-input single-frame imaged target detection system.

In addition to the above features, the system according to this aspect of the presently disclosed subject matter can include one or more of features (xlv) to (liii) listed below, in any desired combination or permutation which is technically possible:
(xlv) the step (1) comprises receiving information indicative of the different relative positions.
(xlvi) the different relative positions being associated at least partially with images captured at different times, wherein said step (1) comprises receiving indication of a relative order of capture of each image of the at least two images.
(xlvii) the different relative positions being associated at least partially with images captured by different capturing imaging devices,
wherein said step (1) comprises receiving indication of relative position of a capturing imaging device associated with each image of the at least two images.
(xlviii) the method further comprising, performing, following said step (1), the following:
3) outputting an indication of the at least one candidate target detection region.
(xlix) the at least one candidate target detection region comprises the first image, wherein the at least one candidate target detection region is indicated on the detection image.
(l) the indication comprises at least one of coordinates associated with the at least one candidate target detection region, the coordinates being associated with one of the data representation of the at least one object and an image of the at least two images.
(li) the at least two image inputs comprise three image inputs, wherein the at least two images comprise three images.
(lii) the multiple-image-input single-frame target detection system utilizes a neural network.
(liii) the method further comprising, after performing said step (2), performing the method of any one of the first and/or the second aspects of the presently disclosed subject matter. According to a fourth aspect of the presently disclosed subject matter there is provided an image brightness compensation system, comprising a processing circuitry and configured to perform the following:
1) receive at least one monitoring image of an imaged portion of the object captured by at least one monitoring imaging device,
2) analyze the at least one monitoring image to identify a degree of brightness of the imaged portion of the object; and
3) perform an imaging adjustment based on at least the degree of brightness of the imaged portion of the object.

This aspect of the disclosed subject matter can optionally include one or more of features (liv) to (lvi) listed below, in any desired combination or permutation which is technically possible:
(liv) the image brightness compensation system comprises least one illumination device, wherein the imaging adjustment comprises at least one of: adjusting the intensity of the at least one illumination device; adjusting an exposure time of at least one capturing imaging device.
(lv) the method further comprising repeating said steps (i) through (iii) in respect of at least one other imaged portion of the object, the other imaged portion of the object constituting the imaged portion of the object.
(lvi) the step (3) comprises performing the method performed by the system of one of the first and second aspects of the presently disclosed subject matter.

The system disclosed herein according to various aspects, can optionally further comprise one or more of features (lvii) to (lix) listed below, mutatis mutandis, in any technically possible combination or permutation:
(lvii) the at least one object comprises a vehicle.
(lviii) the at least one candidate target detection region comprises at least one candidate damage region, the at least one candidate damage region indicative of detected possible damage to the at least one object.

(lix) the possible damage to the at least one object comprising at least one of a scratch and a dent.
(i) the scratch is a paint scratch.

According to a fifth aspect of the presently disclosed subject matter there is presented the computerized method performed by the system of any of the above aspects.

According to a sixth aspect of the presently disclosed subject matter there is presented a non-transitory program storage device readable by machine, tangibly embodying a program of instructions that, when executed by a computer, cause the computer to perform any of the above methods.

The computerized methods, and the non-transitory computer readable storage media, disclosed herein according to various aspects, can optionally further comprise one or more of features (i) to (lix) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1 illustrates an exemplary generalized view of a vehicle inspection system, in accordance with some embodiments of the presently disclosed subject matter;

DETAILED DESCRIPTION

Figure 2A:
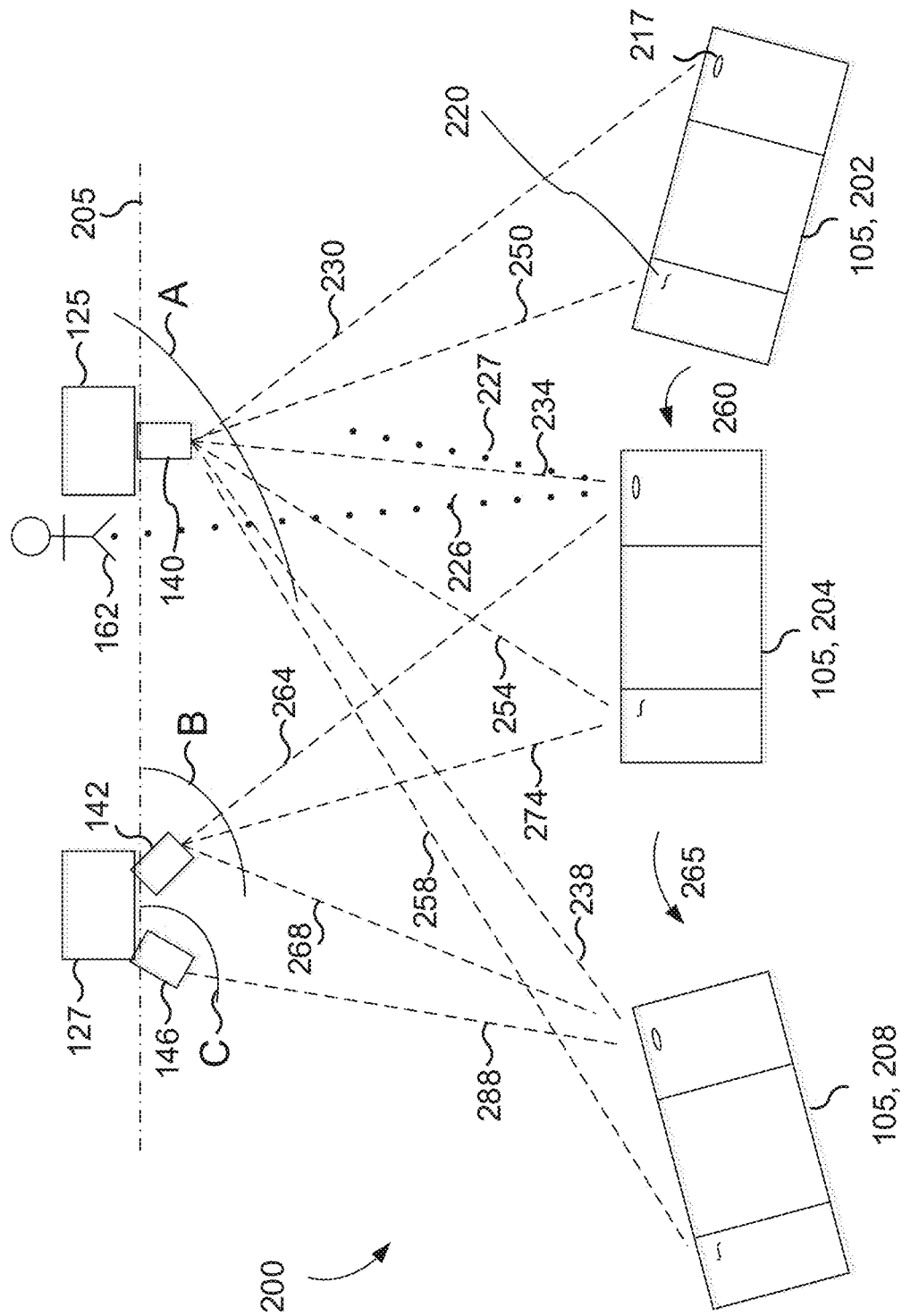
FIG. 2A illustrates an exemplary generalized depiction of imaging angles, in accordance with some embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

Unless specifically stated otherwise, as apparent from the following discussions, it is appreciated that throughout the specification discussions utilizing terms such as "receiving", "processing", "classifying", "determining" or the like, refer to the action(s) and/or process(es) of a computer that manipulate and/or transform data into other data, said data represented as physical, e.g. such as electronic or mechanical quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, systems 102, 705, 720, 820, 830, 843 and 1210 and processing circuitries 730, 824, 834, 840, and 1220 disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that that the teachings of the presently disclosed subject matter are not bound by what is described with reference to any of the figures or described in other documents referenced in this application.

Bearing this in mind, attention is drawn to FIG. 1, schematically illustrating an example generalized view of a vehicle inspection system, in accordance with some embodiments of the presently disclosed subject matter. A system such as disclosed herein may, in some examples, detect candidate damage regions, which are indicative of detected possible damage to a vehicle, and may verify the detected damage, by processing information indicative of multiple images of these regions and determining that these candidate regions meet defined detection repetition criteria.

The example system 100 illustrated in FIG. 1 is a computer-based vehicle inspection system for automatically inspecting a vehicle for damage or other anomalies. In some examples, system 100 is also referred to herein as image acquisition system 100. System 100 comprises a computerized system 102 for object inspection, and target detection and verification. One non-limiting example of system 102 is for vehicle damage inspection, detection and verification. Examples of the computerized system are disclosed further herein with reference to FIGS. 7, 8 and 12. Example system 100 includes a set of image acquisition devices 140, 144, 142, 146, 148 (also referred to herein as imaging devices). In some examples, these devices are also referred to herein as capturing imaging devices, as distinguished from monitoring imaging devices 136 (disclosed below). System 100 can be configured to obtain, from the set of imaging devices such as 140, a plurality of sets of images capturing/acquiring a plurality of segments or portions of a vehicle, e.g. images of the vehicle surface. The set of imaging devices such as 140 can be operatively connected to system 102 and the captured images can be transmitted to system 102 via wired or wireless communication 104.

The imaging acquisition devices used herein can refer to any kind of imaging devices or general-purpose devices equipped with image acquisition functionalities that can be used to capture vehicle images at a certain resolution and frequency, such as a digital camera with image and/or video recording functionalities. The set of imaging devices 140, 144, 142, 146, 148 can comprise multiple camera devices located (mounted or otherwise situated) on at least one side of a vehicle 105 (e.g. on at least one side of an inspection passage/lane through which the vehicle 105 passes), and they may be configured to capture a plurality of segments or portions of a vehicle. In some examples, some or all of the cameras are configured to capture still images. In other examples, some or all of the cameras are configured to capture image frames of a video recording. In other examples, some or all of the cameras are configured to capture both still and video images. In some embodiments, there are camera devices located on both sides of the vehicle, such that images of both sides of the vehicle can be simultaneously acquired and processed. Note also that the presently disclosed subject matter discloses the non-limiting example of two-dimensional (2-D) image frames, such as those shown in FIGS. 3, 4 and 5. However, the disclosure applies as well to one-dimensional image captures, such as those captured by a line scanner 140, 144.

In some embodiments, image acquisition system 100 can also comprise a supporting structure. The supporting structure can comprise one or more poles 125, 127 positioned on at least one side of the inspection passage. FIG. 1 illustrates an exemplary supporting structure that comprises two poles, both positioned on one side of the inspection passage. Each pole has a set of imaging devices attachable thereto. The imaging devices can be attached at an appropriate height and/or angle in relation to the vehicle so as to capture image frames covering a Field of View (FOV) corresponding to a predetermined region. In some examples, the imaging devices are mounted in a fixed manner, pointing in a fixed direction with a fixed FOV. In other examples, the imaging devices can move, e.g. along a rail, and/or can rotate so as to point in a different direction, in a pre-defined manner.

In some cases, the vehicle 105 can be a moving 110 vehicle which passes through an inspection passage equipped with such imaging devices. In some other cases, object/vehicle 105 is not imaged while moving. Rather, it rests in one location, and images of it are captured. It may be, in some examples, that one or more devices of the set of imaging devices are mounted on a movable platform so as to move 180 relative to the vehicle, and are configured to capture image frames of the vehicle from multiple relative positions and angles. In some other examples, the object 105 rests in one location, and a plurality of imaging devices 140, 142, 144, 146, 148 capture images of the object from multiple positions and multiple angles relative to the object. Such an image capture by multiple devices is done simultaneously, in some examples. Since the image frames are captured by imaging devices located at different positons relative to the object, this can, in some cases, cause a change in the light reflection behavior from image to image (as disclosed with reference to, for example, reflection 227 of FIG. 2A and reflection 325 appearance on image frame 334 of FIG. 3), without the vehicle being required to move.

In some examples, there are sufficient imaging devices, and/or the image device(s) capture image frames from a sufficient number of different positions relative to the object, so as to capture images of the entire object.

In still other examples, combinations of the vehicle and/or imaging devices move.

Figure 2B:
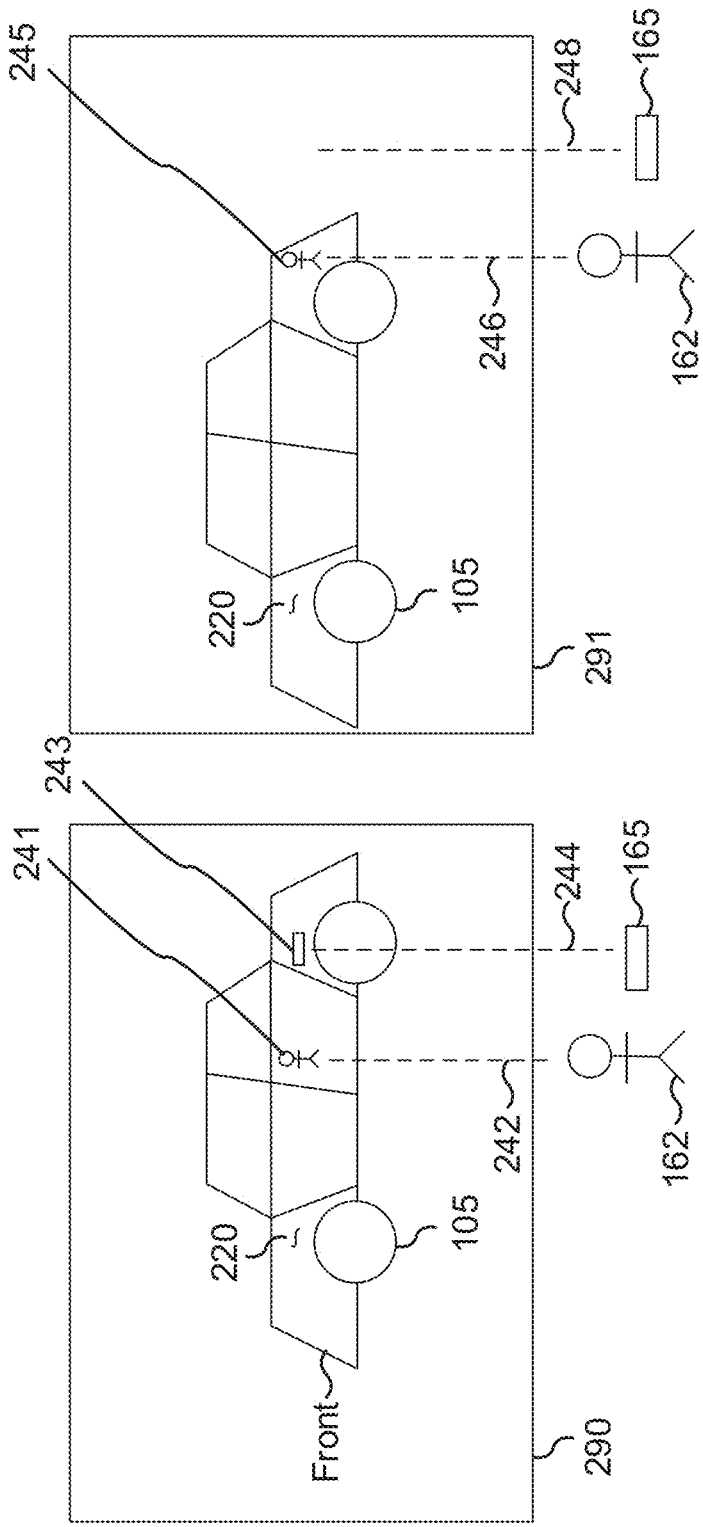
FIG. 2B illustrates an exemplary generalized depiction of captured image frames, in accordance with some embodiments of the presently disclosed subject matter.

As will be disclosed further herein with reference to FIGS. 2A and 2B, in some examples certain captured image frames will include appearances, on portions of the object, of possible targets of interest such as scratches or other possible damage, or labels. Such appearances may occur in certain image frames that include that portion of the object, and not in others. Regions on an image frame, where there has been detection of a possible target of interest, are referred to herein also as candidate target detection regions.

There is, in some examples, a need to verify, in an automated fashion, whether such detected regions of possible damage to the vehicle are in fact regions where there is damage (or other targets of interest), or are merely false detections associated with, for example, reflections. In some examples, imaging such a detected region of possible damage from multiple relative positions, of the capturing imaging device(s) and of the relevant imaged portion of the object, may enable such verification. Example methods are disclosed herein, with reference to FIGS. 2B, 3, 4, 5, 6, 10A and 10B, to perform such verification of target detection. These methods utilize for example a target detection verification system, to perform steps such as:

(d) receiving information indicative of two or more image frames of the vehicle(s) or other object(s), where this information comprises one or more candidate target detection regions (e.g. candidate damage regions), the candidate target detection region(s) indicative of possible detected targets of interest associated with the at least one object(s), (e) processing the information indicative of the two or more image frames, to determine whether or not each candidate target detection region meets one or more detection repetition criteria;

(f) in response to the one or more detection repetition criteria being met, classifying the relevant candidate target detection region as a verified target detection region (e.g. a verified damage region).

In some cases, such a process can facilitate output of an indication of the verified target detection region(s).

In some examples, the one or more detection repetition criteria are indicative of repetition of the candidate target detection region(s) in locations of the two or more image frames that are associated with the same location on a data representation of the object (e.g. "15 cm above the front left wheel").

Returning to FIG. 1, in some examples, system 100 comprises one or more monitoring imaging devices, e.g. monitoring camera 136. In some examples, the same monitoring imaging device, or set of devices, is used for both triggering and brightness/intensity recognition functions, as disclosed further herein with regard to FIGS. 10A and 11. In other examples, each of these functions has a different monitoring camera or set of cameras. In some examples, monitoring camera 136 is one or more of the capturing imaging devices 140, 142, 146. In other examples, it is a device or set of devices that are not the capturing imaging devices, e.g. as shown in FIG. 1.

Monitoring camera 136 used for imaging triggering functions may in some cases monitor the vehicle-crossing entry indicator 150 (also referred to herein as trigger-on indicator or trigger-on line) and exit indicator 157 (also referred to herein as trigger-off indicator or trigger-off line). In some examples, these are virtual lines monitored by the system. In other examples, these indicators are actual painted or otherwise marked lines. The camera 136 may instead, or may additionally, monitor vehicle entry into and exit from an image capture region 155. Region 155 may also be referred to herein as an imaging triggering region. Again, this region may be virtual, or may for example be physically marked on the ground or on the floor or lower surface of the system. Triggering functions of this camera, the indicators and the region are disclosed further herein with reference to blocks 1004 and 1013 of FIG. 10A.

It is to be appreciated that the present disclosure is not limited by the specific number, type, coverage, and perspective of the imaging devices and/or the images as being taken, nor by the specific generation methods of the images by the imaging devices.

In some examples, the plurality of sets of images, as acquired by the set of imaging devices, are acquired at a plurality of time points during a relative movement between the vehicle and the set of imaging devices, such that: i) each set of images captures a respective segment or portion of the vehicle that falls within the predetermined region at a respective time point, and ii) the plurality of segments captured in the plurality of sets of images are partially overlapped in such a way that each given point of at least some of the portions of the vehicle, is captured at least at two time points in at least two sets of images. The given point captured in the at least two sets of images are as if captured under different illumination conditions pertaining to different relative positions between the given point and the set of imaging devices at the two time points.

In some embodiments, there can be provided one or more illumination devices or lights 130, 132 located in close proximity to the imaging devices and which provide illumination covering the FOVs of the imaging devices, so as to enable images to be captured at high resolution and quality. By way of example, the illumination devices 130, 132 can be positioned on the side of the passage, e.g. mounted on the poles, to provide peripheral illumination for image acquisition. Optionally, the image acquisition and/or the illumination can be triggered by an external sensing device which can detect the presence/approach of a vehicle (such as, e.g., road loop, IR beam, VMD, etc.).

The imaging devices 140 (and the illumination devices, if any) can be controlled by system 102. System 102 is operatively connected to the set of imaging devices (and the illumination devices, if any) and can be used for controlling the devices (e.g. synchronizing the image acquisition and illumination operation), calibrating the system during a set-up stage, and processing the acquired images of the vehicle so as to detect and verify damage.

Also shown in FIG. 1 are a person 162 and an object 165, e.g. a bag or box, that happen to be in the vicinity of system 100. As will be disclosed further herein, these bodies may be the source of reflections that may appear in image frames.

Note that the disclosure is for the example of a vehicle, and for verification of detected damage. In some examples, the methods and systems disclosed herein can be used to detect and verify detection of anomalies other than damage, e.g. dirt or manufacturing defects. Damage is disclosed herein as one non-limiting example of an abnormality or anomaly.

Abnormalities and anomalies are disclosed herein as one non-limiting example of the more general case of detection of imaged targets, that is detection in an image of a target or feature of the object, or other item of interest to the user that is on the object. As one non-limiting example, the methods and systems disclosed herein may be used to detect the presence of a particular feature which is expected to be on the object. As one example of this, it may be that a particular decal or product label is supposed to appear on a particular location of the object, e.g. a decal with a company logo being present on the body of an automobile above the rear wheel. As another non-limiting example, a signature or logo or the like (e.g. a designer's signature) is supposed to appear on a particular location of an object such as a vase. In such cases, the absence of such features is considered a flaw or an otherwise undesirable situation, and thus it is desirable that the particular feature be detected positively on the relevant location on the object, and that this detection be verified.

Thus, damage or other anomalies, labels, signatures and the like are in some cases all examples of a physical entity that whose image or likeness appears on a captured image frame.

Therefore, candidate damage regions are non-limiting examples of a candidate target detection region, which is indicative of possible detection of a target of interest associated with the object. As will be disclosed further herein, in some cases it is desired to verify that the candidate target detection region is indicative of actual detection of the target of interest, and that the detection on the image of the target is not a false positive. Thus the case of damage to objects, and of candidate damage regions, is disclosed herein as one non-limiting example of the more general case of detection of targets of interest and of candidate target detection region, for ease of exposition.

In some examples, the methods and systems disclosed herein can be used to detect and verify detection of anomalies on objects other than vehicles, e.g. furniture and other manufactured goods. Such objects may in some cases undergo inspection using imaging devices such as 140, 142. Thus vehicles are disclosed herein as one non-limiting example of the more general case of an object, for ease of exposition. Similarly, an automobile is disclosed herein, as one non-limiting example of a vehicle. Other non-limiting examples of vehicles are ground vehicles such as, for example, trucks, buses and trains, watercraft, and aircraft.

Attention is now drawn to FIG. 2A, schematically illustrating an exemplary generalized depiction 200 of imaging angles, in accordance with some embodiments of the presently disclosed subject matter. Vehicle 105 is shown in three different example stages 202, 204, 208 of movement while in view of the imaging devices. Poles 125, 127, illumination device 130, and imaging devices 140, 142, 146, are shown, as non-limiting examples. Note that in some examples the vehicle 105 is not constrained to travel a pre-defined path of movement, such as a track, conveyor or rails. In some such examples, the vehicle can travel freely, veering or turning 260, 265, accelerating and decelerating—driven by e.g. a human driver or autonomously. Thus, the speed of travel, and angle of the vehicle with respect to capturing imaging device 140 at particular point in time in an image capture session, may vary for different image capture sessions inspecting a particular vehicle. Therefore, the image captured by a particular camera 140, at a particular point in time of an image capture session, may in some cases be of a different portion of the vehicle, and in some cases captured from a different relative imaging angle, compared to a similar image taken in a different inspection session. Thus, various captured images may in some cases be associated with different relative positions of the capturing imaging device(s) associated with the images and a particular imaged portion of the object associated with the images. Note that the turn radius of vehicle 105 is exaggerated in the figure, for clarity of exposition.

In the example, vehicle 105 depicts a scratch 220. Scratches are one non-limiting example of damage to the vehicle or other object. Another non-limiting example is a dent in the vehicle body. One example of a scratch is a paint scratch.

Note that the relative positions of a particular capturing imaging a particular imaging device such as e.g. 140 and any particular imaged portion point or region of the vehicle (such as the imaged portion containing scratch 220) vary, as the vehicle moves forward and possibly turns and veers. This may in some cases be a function of at least the position of the imaging device, the direction in which it is pointed, and the speeds and directions of the relative motion between the imaging device and portions of the vehicle surface. For example, the lines of sight (LOS) 250, 254, 258 between the single camera 140 and scratch 220 are very different as the vehicle moves over time along the different positions and attitudes 202, 204, 208. Similarly, these are different lines of sight than the line of sight 274 shown between camera 142 and scratch 220.

In some examples, the different capturing imaging devices 140, 142, 146 are configured to capture image frames substantially synchronously, at substantially the same time. Such synchronization may in some examples enable a more accurate comparison of images, for example as disclosed with reference to FIGS. 4 and 5. In some examples, synchronization circuitry or similar techniques is used to trigger image capture by the cameras substantially synchronously. The degree of synchronization is an engineering decision, in some examples based on one or more of factors such as, for example, rate of image frames capture, speed of vehicle or system movement 110, 180, size and resolution of image frames, size of target areas to be detected and verified (e.g. large scratches vs small pits in paint).

It is disclosed further herein that the geometric maps are calculated based on the relative positions of the various cameras and the imaged portions of the object at a particular time. For such a calculation to be possible, the synchronization between cameras must be such that imaging of a particular portion of the object (e.g. a car door handle) is captured by each relevant camera while the object is located at the same location within image acquisition system 100. In some non-limiting examples, the cameras may be synchronized such that a particular imaged portion of the object has moved no more than several millimeters between capture by different cameras. In some non-limiting examples, the cameras may be synchronized such that a particular imaged portion of the object has moved no more than several centimeters between capture by different cameras.

In some non-limiting examples, the cameras may be synchronized to within a couple of milliseconds. In some non-limiting examples, the cameras may be synchronized to less than one millisecond. Where the imaged object is static during image capture, in some non-limiting examples the synchronization may be to within 10 seconds.

Person 162 is shown as a non-limiting example of a light source. Another non-limiting example of a light source is bag 165. When the vehicle is in position 204, light 226 is incident from light source 162 on a point 217 on the vehicle, shown as an oval, and it is reflected 227. In some cases, this reflection 227 is captured on the imaged recorded by device 140. In some examples, this captured reflection is detected by automated detection systems (examples of which are disclosed further herein) as damage, for example as an apparent scratch, when in fact there is no damage. Examples of this phenomenon are disclosed further herein with reference to reflection 325 appearance on image frame 334 of FIG. 3.

Attention is now drawn to FIG. 2B, schematically illustrating an example generalized depiction of captured image frames, in accordance with some embodiments of the presently disclosed subject matter. In some examples, cameras 140, 142 capture a two-dimensional representation of the plane in their field of view. Thus, a viewed appearance of a target such as a scratch, that it captured in an image frame, may in some cases correspond to a real scratch 220, while in other cases it may correspond to e.g. a reflection that merely appears in the image frame to be a scratch. Note that image frames are in some examples referred to herein also as images, for simplicity of exposition.

In the example of the figure, the two image frames 290, 291 are captured at two points 204, 208 in time of vehicle movement. Looking at the position of the front of the vehicle 105, it can be noted that in frame 291, the vehicle has moved forward (closer to the left edge of the image frames) relative to its position in frame 290. In both frames, scratch 220 appears at the same position over the front left wheel. That is, in both frames the scratch is associated with the same location on a data representation of the vehicle, e.g. "15 cm above the front left wheel". Scratch 220 corresponds to a target of interest, and is not merely e.g. a reflection, since its location on the data representation of the object 105 remains fixed, and does not change, as the vehicle moves. The scratch "moves along with the vehicle". Nor does the scratch's location on the data representation of the object change in image frames captured by different cameras. This location is thus not dependent on time of capture or on the imaging device used. Thus, more generally, the location of a target of interest 220, on the data representation of the object, does not vary based on the relative position of the imaging device 140 and of the particular imaged portion of the object that contains the target of interest.

By comparison, appearances 241 and 245 and 243 do not correspond to damage or to some other target of interest on the vehicle such a label. Rather, 241 and 245 are both reflections 242, 246 of the person 162 on the shiny or reflective surface of vehicle 105, while appearance 243 is a reflection 244 of bag 165. This is evident from a comparison of frames 290 and 291. In 290, reflection appearance 241 is on the rear door, while in 291 the reflection appearance 245 of the same person is on the rear panel. Similarly, in 290 reflection appearance 243 is on the rear panel, while in frame 291 the reflection 248 of the bag 165 has no appearance on the vehicle. Unlike the case of targets of interest such as scratch 220, the reflections appear to "move" along the vehicle as the vehicle moves. In the two images frames 290, 291, the region, including the reflections 241, 245, appears in locations of the images that are associated with different locations on the data representation of the vehicle.

Note that reflections are disclosed as one example of an appearance in an image frame, the location of which on the data representation of the object, varies, and does not stay the same, as the relative position of the imaging device 140 and of a particular imaged portion 217 of the object 105 changes. Other non-limiting examples include image acquisition noise and problems with the capturing imaging device 140. Reflections, acquisition noise etc. thus are not in fact targets of interest on the object 105, and if detected as such by automated detection systems, they represent false detections.

Point 217 in FIG. 2A is thus an example of a point on the vehicle which receives a particular light reflection when the vehicle 105 is at certain positions 204 and angles, and does not receive that particular light reflection when the vehicle is at certain other positions 206 and angles.

There is thus in some examples a need to verify, in an automated fashion, whether such detected regions of possible damage to the vehicle are in fact regions where there is damage or other targets of interest, or are merely false detections associated with, for example, reflections. In some examples, imaging such a detected region of possible damage from multiple relative positions, of the capturing imaging device(s) and of the relevant imaged portion of the object, may enable such verification. Example methods are disclosed herein, to perform such verification of target detection, utilizing for example a target detection verification system, to perform steps such as:

(a) receiving information indicative of two or more image frames of the vehicle(s) or other object(s), where this information comprises one or more candidate target detection regions (e.g. candidate damage regions), the candidate target detection region(s) indicative of possible detected targets of interest associated with the at least one object(s), (g) processing the information indicative of the two or more image frames, to determine whether or not each candidate target detection region meets one or more detection repetition criteria;

(h) in response to the one or more detection repetition criteria being met, classifying the relevant candidate target detection region as a verified target detection region (e.g. a verified damage region).

In some cases, such a process can facilitate output of an indication of the verified target detection region(s).

In some examples, the one or more detection repetition criteria are indicative of repetition of the candidate target detection region(s) in locations of the two or more image frames that are associated with the same location on a data representation of the object (e.g. "15 cm above the front left wheel").

In some examples, step (a) may include, instead of, or in addition to the above, processing the information indicative of the two or more image frames, to determine whether or not each candidate target detection region meets one or more non-detection repetition criteria. The non-detection repetition criteria may be indicative of repetition of the candidate target detection regions in locations 241, 245 of two or more image frames that are associated with different locations on a data representation of the object. In such examples, step (b) may include, in response to one or more of the detection non-repetition criteria being met, classifying the candidate target detection region(s) as non-verified target detection region(s).

In some examples, the images that are received and processed have at least partial overlap, constituting an overlap area 610, 620 (see further herein with reference to FIG. 6), and the candidate damage region(s) appear at least partially in the overlap area. In some examples, these image frames are associated with different relative positions of the capturing imaging device(s) that are associated with the two or more images and the relevant imaged portion of the object.

These differences in relative position may in some cases be due to, among other factors, the position of the respective imaging device 140, the position and orientation 202, 204, 208 of the vehicle or other object 105 at the moment of capture of a particular frame, and the position of the particular portion of the vehicle being imaged, in relation to the vehicle (for example, side-view mirror near the front vs rear door handle). The relative position of the portion of the vehicle will be reflected in the relative position, within a data representation of the vehicle, of the portion of the data representation corresponding to the portion of the vehicle that was imaged. These data representations can be used, in some examples, when determining to what portion of the vehicle (or other object) each captured image frame corresponds.

Note that the lines of sight 230, 234, 238 between camera 140 and point 217, and the lines of sight 264, 268 between camera 142 and point 217, are also different from each other as the vehicle moves over time. Also, at the same vehicle position 208, for example, the lines of sight 238, 268, 288 to the single point 217 from the three imaging devices 140, 142, 146 differ, as indicated by the different angles A, B, C between the imaginary line 205 and the various LOS to 217 at position 208.

In some examples, verification methods such as disclosed herein may have at least certain example advantages. In some typical image scans of vehicles, approximately 1000 to 1500 candidate damage regions may be detected per scan, most of these false detections. Automated imaging detection, without verification, thus in many cases does not provide accurate results. Methods such as disclosed herein can in some cases filter out most of the false detections, and can output only a handful of verified damage regions, in some cases one verified region, indicative of actual damage, e.g. within a matter of seconds.

A system such as 720 is in some examples of receiving image frames corresponding to relatively small areas of the object, and of automatically understanding the particular movement of the object based on the received image frames, and of determining the relative positions of the cameras and of each imaged portion of the object, so to be able to identify the overlap areas and to look for matching candidate detection regions indicative of the same target appearance.

For at least these reasons, using the system 720 can, in some non-limiting examples, increase the detection rate of defects and other targets by 60-80% compared to inspection and verification by a human.

Moreover, the system 100 in some examples inspects the entire vehicle simultaneously, using information from consecutive image frames from adjacent cameras. This may enable verification in a more efficient manner than visual inspection by humans, in some cases taking approximately within a matter of seconds.

In some examples this can, in an efficient and automated manner, and with high accuracy, indicate to users exactly where there is damage, or other targets of interest. In one application thereof, a vehicle can be inspected when leaving the factory, arriving at and exiting the ship, arriving at and exiting a dealer showroom, and arriving at and exiting a repair garage. At each stage, such a scan can verify what damages did and did not exist, and determination can be made as to when the damage likely occurred, and under whose control.

Note that not every verified target detection region will necessarily correspond to a true target of interest, from the point of view of the particular business application. For example, if there is dirt stuck on a vehicle to the right of the wheel, it will appear in multiple images that include the wheel area, and may in some cases be verified as damage by a damage verification system, even though the dirt is not true damage.

Figure 3:
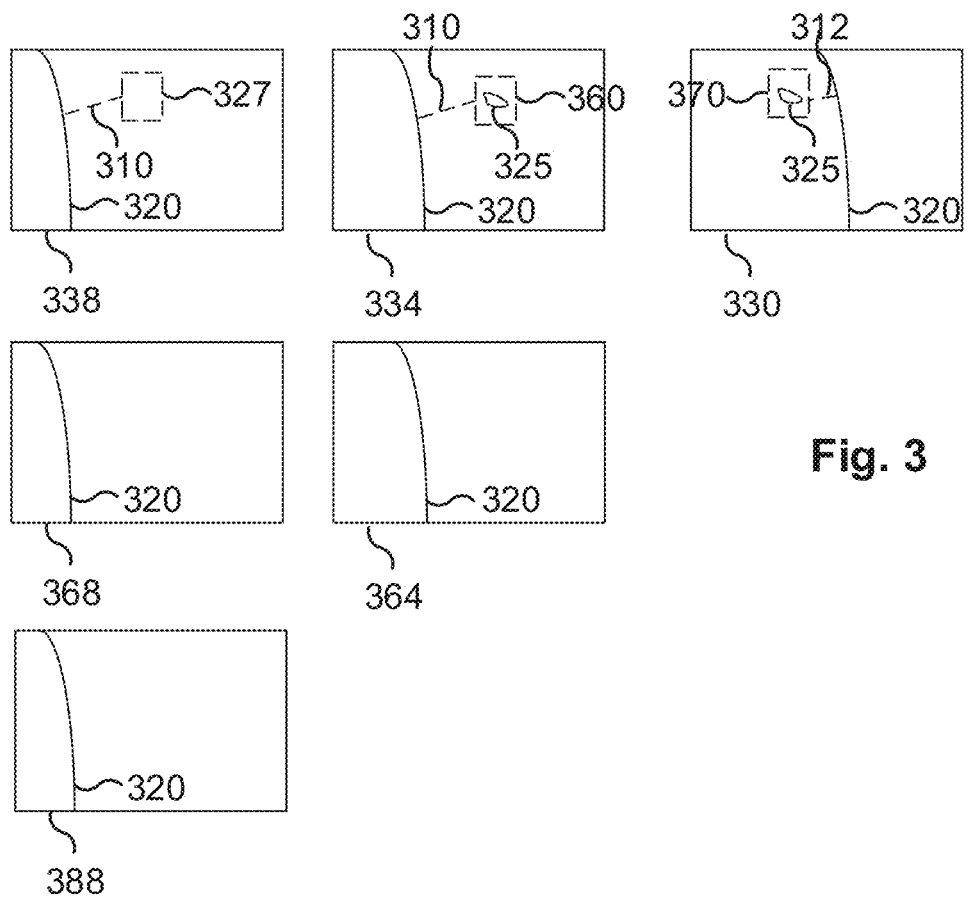
FIG. 3 illustrates an exemplary generalized depiction of captured image frames, in accordance with some embodiments of the presently disclosed subject matter.

Attention is now drawn to FIG. 3, schematically illustrating an exemplary generalized depiction of captured image frames, in accordance to some embodiments of the presently disclosed subject matter. The figure shows images of a portion of vehicle 105 that includes point 217. The upper three image frames 330, 334, 338 were captured by device 140 when the vehicle 105 was at each of positions 202, 204, 208, the two image frames 364, 368 were captured by device 142 when the vehicle was at each of positions 204, 208, and the lowest image frame 388 was captured by device 146 when the vehicle was at position 208. The six example images correspond to the different lines of sight 230, 234, 238, 264, 268, 288 respectively, which are shown in FIG. 2A.

In the example of the figure, region 327 of image frame 338 contains in it an appearance of the target location 217 on the surface of the vehicle. Point 217 has no damage in this image frame, and thus does not appear. The same is true of image frames 364, 368, 388 (for which the regions containing 217 are not shown on the figure). On the other hand, in image frame 334 there is a region 360 which contains the appearance of a mark 325, for example what appears to be an appearance of a flaw on the vehicle surface's paint—perhaps a paint smudge or a scratch. Also, in image 330 the mark 325 appears, but in a region 370 that is on a different location on the data representation of the vehicle. However, in reality, there is no such damage on the vehicle, and mark 325 is a result of the reflected 227 light 226 which was captured by device 140. An automated damage detection system 710 (disclosed further herein with reference to FIG. 7) of system 102 may in some examples detect that region 360 of the image 334 contains an area of possible vehicle damage, while this is in fact a "false positive", caused by a reflection (for example). Region 360 of the image frame 334 may be referred to herein as a candidate damage region, since it is indicative of detected possible damage to the at least one vehicle, but it has not yet been verified that the corresponding region on the vehicle in fact contains actual damage. Region 327, by contrast, shows no indication of possible damage, and thus is not a candidate damage region. A candidate damage region is a non-limiting example of the more general term of a candidate target detection region.

In the example, the images presented have an overlap area, and the portion of the automobile (region 325) containing point 217 appears in this overlap area. Regions 327 and 325 of their respective images correspond to the same location area on the vehicle surface. For example, they are both in a relative position 310 from a common reference location on the two images, e.g. curved line 320 that represents the line separating the front and rear doors of the imaged automobile. Thus, regions 327 and 325, and the corresponding regions (not shown) on the other image frames, are in locations of the at least two images that are associated with the same location on a data representation of the vehicle. However, the images containing region 327 and region 325 are associated with different relative positions of the camera and the imaged portion (regions 327, 325) of the object since they were captured at different times, when the vehicle 105 and camera 140 were e.g. at different distances and angles from each other. Thus the effect on the two image frames of reflections and the like is different.

However, by comparing the image frames, it may be seen that the other cameras did not capture an appearance corresponding to the mark 325 near point 217, nor did camera 140 itself capture such a mark in images captured at points in time before and after image 334. Similarly, such an appearance 325 was captured in another image frame 330, but in a region 370, which is located at a distance 312 from curved line 320 that is different from the distance 310. Thus region 370, unlike regions 325 and 327, corresponds to a location on the data representation that is different from point 217. The mark 325 thus appears to "move" along the vehicle in different image frames.

A target detection verification system 720 (disclosed further herein with reference to FIG. 7) can thus determine, using or more detection repetition criteria, that 325 is a "false positive" detection, and that 360 is in fact not a region on the image frame that indicates an actual target of interest such as vehicle damage or other anomaly. Since the candidate damage region is in fact indicative of a reflection of light from the vehicle, and not of actual vehicle damage, the region may not meet the detection repetition criteria. For example, the criteria may be whether there is repetition of a particular candidate damage region 360 in locations 327 of the images that are associated with a same location on a data representation of the vehicle. In one example, the detection repetition criterion used is determining whether the candidate damage region appears in all of the image frames processed. In this example, the candidate region 360 does not meet the detection repetition criteria, since damage is indicated in only one of six image frames checked, and therefore the damage is not verified. Note that the above description is a non-limiting example only.

In other examples, the detection repetition criterion is met if the candidate damage region appears in at least two of the image frames processed. The number of repetitions needed to meet the criterion is an application-specific decision based on the business need, and may be based on the operating point of the particular application. If more repetitions are required, there will be fewer false alarms of target detection, and thus higher confidence that there was a detection. However, there will be fewer verifications, and thus the final result is a lower verified detection rate of targets. There is thus a trade-off between number of output 775 detections and the confidence in the verification.

Recall that the example images of FIG. 3 are associated with different relative positions, between the respective imaging devices and the respective imaged portion of the vehicle (the portion of the vehicle that includes point 217). In the example of comparing the three image frames 330, 334, 338, the different relative positions, associated with the multiple image frames, are associated at least partially with the images being captured at different points in time 202, 204, 208—even in a case where they were all imaged by the same camera 140. In such a case, the detection repetition criteria may include a temporal detection repetition criterion, indicative of the time of capture of each image, comparing images captured at different times. By contrast, in the example of comparing the three images 338, 368, 388, or the two images 334, 364, the different relative positions, associated with the multiple image frames, are associated at least partially with the image frames being captured by different imaging devices 140, 142, 146—even in a case where they were all captured at the same time 208 or 206. The reason is that different cameras have different positions relative to a particular portion of the vehicle that is imaged at a particular time, and they have different orientations. Thus, again, the effects on the two images, of reflections and the like, are different. In such a case, the detection repetition criteria may include a spatial detection repetition criterion, comparing images captured by different capturing imaging devices, which are not co-located.

In some examples, the comparison is done across both different imaging devices and different times, for example comparing image frames 334 (device 140 at time 204) and 368 (device 142 at time 208). In some examples, this may be referred to as a temporal-spatial detection repetition criterion, comparing images that were taken at different times by different capturing imaging devices.

Figure 4:
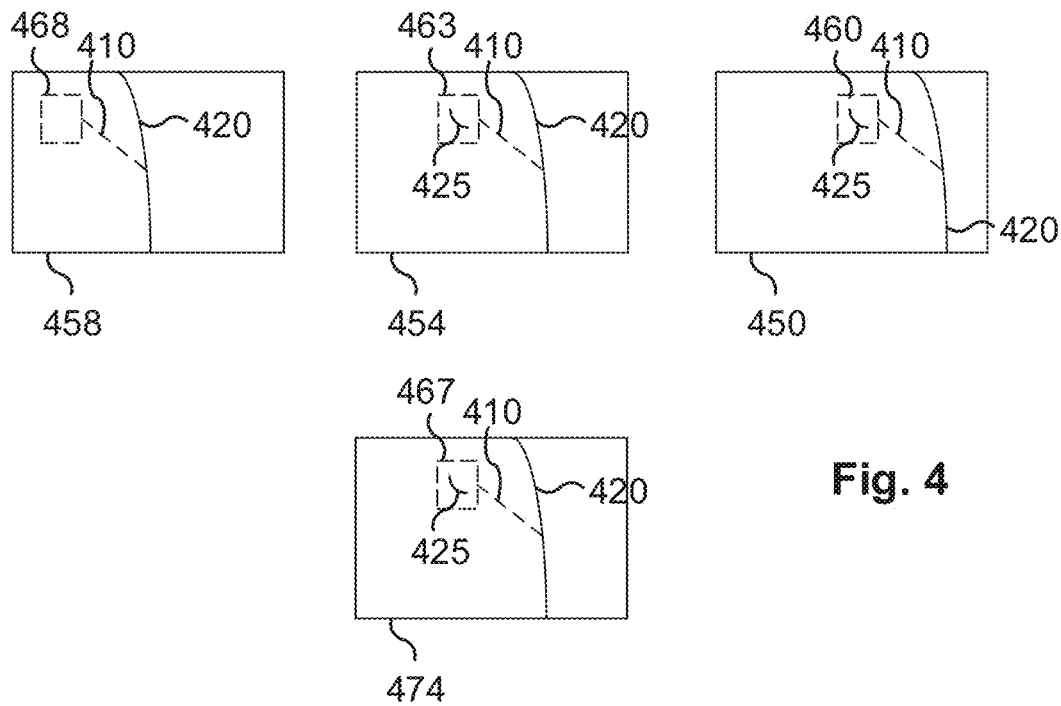
FIG. 4 illustrates an exemplary generalized depiction of captured image frames, in accordance with some embodiments of the presently disclosed subject matter.

Attention is now drawn to FIG. 4, schematically illustrating an example generalized depiction of captured image frames, in accordance with some embodiments of the presently disclosed subject matter. The figure shows images of a portion of vehicle 105 that includes scratch 220. The upper three image frames 450, 454, 458 were captured by device 140 when the vehicle 105 was at each of positions 202, 204, 208. The image frame 474 was captured by device 142 when the vehicle was at position 204. The four example image frames correspond to the different lines of sight 250, 254, 258, 274, respectively, which are shown in FIG. 2A.

In the example, candidate damage region 460 of image frame 450 contains an appearance 425 of the scratch 220 on the vehicle. The same is true of image frames 454, 474, containing candidate damage regions 463, 467. An automated damage detection system 710 (see FIG. 7) of system 102 may have detected these regions. On the other hand, in image frame 458 the corresponding region 468 does not contain an appearance of damage corresponding to 425, and thus is not a candidate damage region. The regions 460, 463, 468, 467 all correspond to the same location area on the vehicle. For example, they are both in a relative position 410 from a common reference location on the two images, e.g. curved line 420 that represents the line separating the front and rear doors of the imaged automobile.

In some cases, target/damage verification system 720 determines, using detection repetition criteria, e.g. that the candidate damage image 425 is repeated in regions 460, 463, 467 that are associated with a same location on a data representation of the vehicle. The system may thus verify that 425 is indeed an imaged appearance corresponding to actual damage to vehicle 105, and thus that 460 is a verified damage region.

For example, the system 720 may compare the three image frames 450, 454, 458, associated at least partially with the frames being captured by the same camera 140 at different points in time 202, 204, 208, and may use a temporal detection repetition criterion. In another example, it may compare only the two image frames 450, 454, and may use a temporal detection repetition criterion. It will find that the candidate damage region appears in 100% of the processed images. In yet another example, the system compares the two image frames 454, 474, captured by different imaging devices 140, 142 at the same time 208, and applies a spatial detection repetition criterion. It will find that the candidate damage region appears in 100% of the processed image frames. In a fourth example, all four image frames of FIG. 4 are compared, across both different imaging devices and different times, and the candidate damage region is found to appear in three out of four of the processed images. Note that the above description is a non-limiting example only.

Note that if the system was configured to compare only image frame 454 and the image frame 458 following it temporally, there would not be a match, and the candidate damage region would, erroneously, not be verified. Thus, as indicated above, the choice of how many image frames to compare to verify a detected candidate target detection region, as well as the number or percentage of matches required for verification, is an engineering business decision associated with the particular service or product application. The choice may be based on considerations such as, for example, the accuracies required when determining false-positives and false-negatives, the number of imaging devices, the number of image frames per camera, and the rate of imaging over time.

Note that FIGS. 1-4 provide only a general disclosure of the subject matter, for ease of exposition. The figures disclose non-limiting examples only. For example, the vehicle 105 may be photographed in more positions than the three shown, there may be more imaging devices and lights, as well as lines of sight, than are shown in FIGS. 1-2. There may be more image frames available for processing, and more candidate regions per image frame, than those shown in FIGS. 4-5. More examples of choosing image frames to process and compare are disclosed with regard to FIG. 5.

Figure 5:
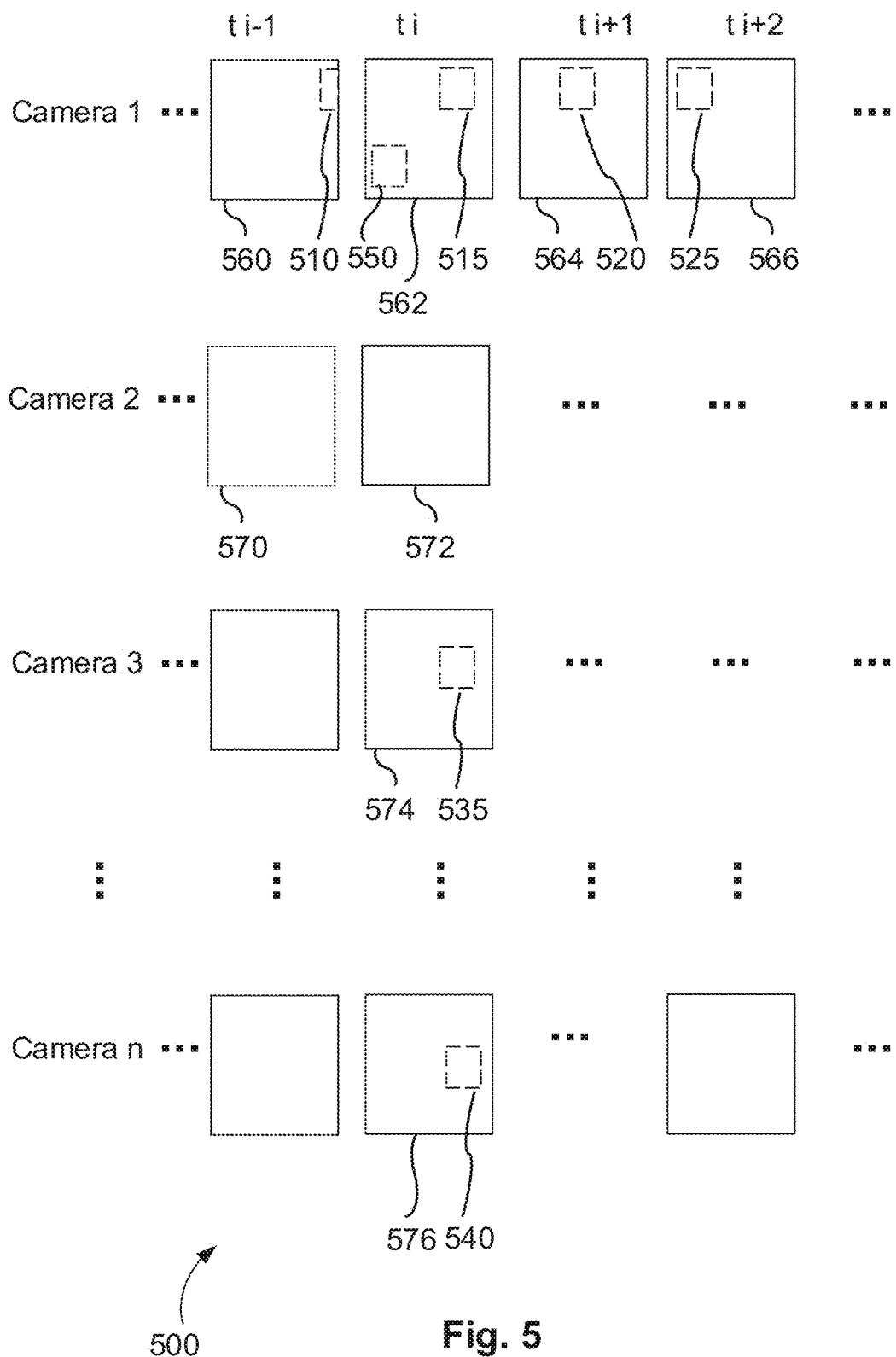
FIG. 5 illustrates an exemplary generalized depiction of captured image frames, in accordance with some embodiments of the presently disclosed subject matter.

Attention is now drawn to FIG. 5, schematically illustrating an exemplary generalized depiction of captured image frames, in accordance with some embodiments of the presently disclosed subject matter. The figure illustrates the possibility of the system 102 generating multiple image frames 500, captured by multiple imaging devices 1 to n, each capturing multiple image frames at times before and after any given time Assume that the current task of system 720 is to attempt verify the two candidate damage regions 515 and 550 that appear on the image frame 562, captured by Camera 1 at $t_i$. For example, Camera 1 may be camera 140. In some examples, this arrangement 500 may be referred to herein also as matrix 500 of image frames. In some examples one or more of the image frames are black and white, grayscale and/or color, depending for example on the specific capturing imaging devices utilized.

Figure 7:
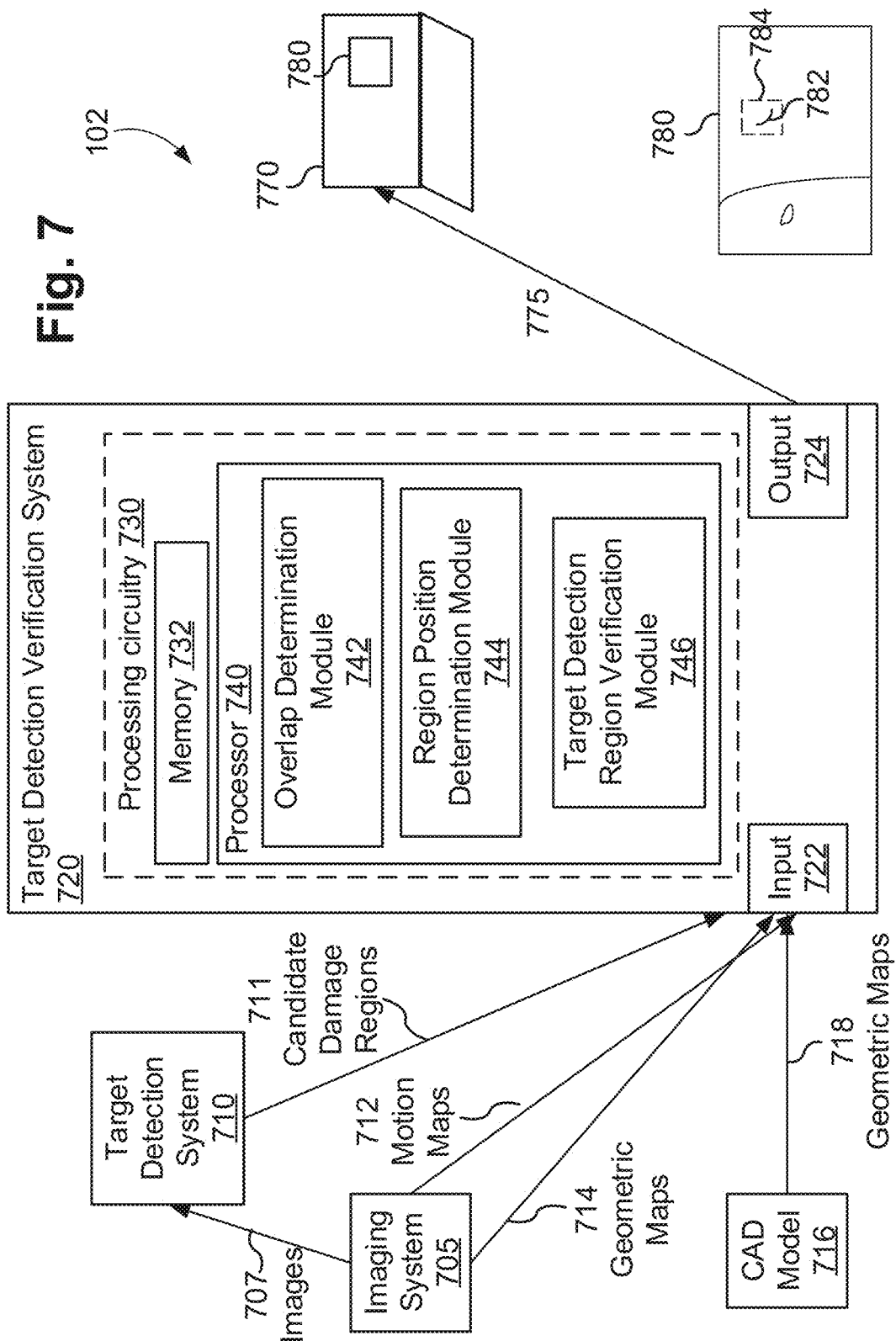
FIG. 7 illustrates a generalized example schematic diagram of an inspection, detection and verification system, in accordance with certain embodiments of the presently disclosed subject matter.

In some examples, these image frames are input to damage verification system 720, as disclosed further herein with reference to FIG. 7. In some examples, this system has knowledge of the time of capture of each image frame (whether an absolute time, or a time relative to capture of other frames), and/or of the capturing imaging device associated with each image frame. In some examples, this information is sent along with the image frame to system 720. In other examples, the information is indicative of these parameters, but is not transferred explicitly. For example, the system 720 may be configured such that the time of receiving of a particular image frame, or the order of the arrival of the image frame, are indicative of the time of capture and/or of the capturing imaging device. In some examples, the system receives information indicative of the relative position of the candidate damage region(s) on the image frame(s). For example, the system 720 may be able to analyze the region and determine its coordinates relative to the image frame. As another example, the system 720 may receive explicitly the coordinates of one or more of the candidate damage region(s) on an image frame(s).

In one example, the system is configured to compare the candidate damage regions of image 562 to image 564 that immediately precedes it in time. In another example, 562 is compared to image frame 560 that immediately follows it in time. Image frames 564 and 560 are examples of temporally-consecutive captured image frames, with respect to image frame 562. In a third example, 562 is compared to both 564 and 560. In another example, more than three image frames are compared, e.g. comparing 562 also to image 566. In another example, time $t_{i+1}$ is skipped, and image frame 562 of $t_i$ is compared only to image frame 566 captured at $t_{i+2}$. In all of these examples, using temporal detection repetition criteria, candidate damage region 515 will be verified, since regions 520, 510, 525 are all found to contain the same appearance of apparent damage, and the damage in all of them is associated with the same location on a data representation of the vehicle, to which system 720 has access. Note that the regions 510, 515, 520, 525, associated with the same location on the data representation, appear in different locations within their respective image frames 560, 562, 564, 566, since the vehicle 105 moved as the images were captured. Similarly, in all of these examples, candidate damage region 550 will not be verified, since no regions are found to contain the same appearance of apparent damage, or other target of interest, associated with the same location on the data representation of the object 105.

In one example, the system compares the candidate damage regions of image frame 562 to image 572 captured at the same time by the "next" (e.g. adjacent physically) imaging device, Camera 2 (e.g. camera 142). Image frame 572 has no region corresponding to 515, and the verification fails. In another example, 562 is compared to image frame 574 that was captured at the same time by camera 3 (e.g. 146), which may be several cameras distant from Camera 1. Image 572 has a region 535 corresponding to 515, containing the same appearance of apparent damage, and the damage in both of them is associated with the same location on a data representation of the vehicle. In that example, the verification succeeds. In a third example, 562 is compared to both 572 and 574. In another example, more than three image frames are compared, e.g. comparing 562 also to image 576, captured by Camera n. In other examples, image frame 572 is skipped, and 562 is compared directly to 574 and/or to 576. Various other combinations of cameras may be used in the comparison of image frames to those of Camera 1. In all of these examples, a spatial detection repetition criterion used. Note also, that in all of these examples, candidate damage region 550 will not be verified, since using the spatial detection repetition criteria, no regions are found to contain the same image of apparent damage, associated with the same location. In some typical but non-limiting examples, target detection verification system 720 compares two to ten image frames that have an overlap area, to determine if there is repetition of one or more candidate detection regions. In other non-limiting examples, up to hundreds or more image frames can be compared to determine if there is such a repetition.

In some examples, the comparison is done across both different imaging devices and different times, for example comparing image frames 562 (Camera 1 at time t) and 570 (Camera 2 at time $t_{i+1}$), using one or more criteria that may be referred to herein also as a temporal-spatial detection repetition criteria. Thus, rather than merely going "across" or "up and down" along the image frames of matrix 500, in some examples the method may compare diagonally. Various combinations of imaging devices and times is possible. One non-limiting example is to look also at four other cameras, and look at times $t_{i-5}$, $t_{i-10}$, $t_{i+5}$, and $t_{i+10}$ for each camera, and requiring a location match of the candidate regions in image frame 562 in a certain percentage of the respective images.

Note that the disclosure above has been of a case of attempting to verify candidate regions 515, 550 of image frame 562. The same techniques may be used to verify, for example, candidate damage region 520 of image frame 564, or any other candidate damage region (or other candidate target detection region) detected in one of the set of images captured during the inspection/imaging session. Note that the above description is a non-limiting example only.

Figure 6:
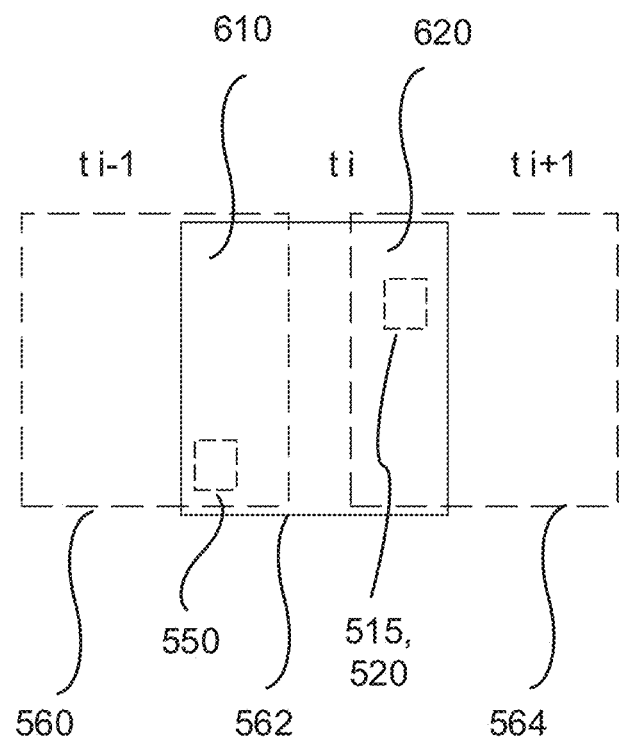
FIG. 6 illustrates an exemplary generalized depiction of image frame overlap, in accordance with some embodiments of the presently disclosed subject matter.

Attention is now drawn to FIG. 6 schematically illustrating an exemplary generalized depiction of image frame overlap, in accordance with some embodiments of the presently disclosed subject matter. In some examples, image frames taken consecutively in time should have at least partial overlap 610, 620. The example of the figure shows image frames 560, 562, 564, captured at consecutive $t_{i-1}$, $t_i$ and $t_{i+1}$. However the same principle may apply as well to image frames captured at the same time by different image devices. For example, images 562 and 572, captured by Cameras 1 and 2, may overlap at least partially (not shown in FIG. 6). The configuration of cameras, of image frame capture rate, and of speed of motion of the vehicle or of the cameras or lights, should be such that each part of the vehicle has multiple image frames that include a capture thereof. This may help to enable determination whether the same appearance indicative of damage (e.g. a particular shape of a scratch) repeats itself in multiple regions 515, 520 that have the same location on the data representation, or, alternatively whether a candidate damage region 550 has no corresponding image of the candidate damage in the overlap areas 610, 620 of other images. In some examples, the candidate damage region(s) appear at least partially in the overlap area 610, 620.

The regions 510, 515, 520, 525 illustrate the partial overlap concept. They all show imaged appearances of the same scratch 220, where 220 is on one particular location of the vehicle. However, each of those regions has a different position relative to the edges of the respective image frame, as can be seen in FIG. 5. Similarly, FIG. 5 shows that region 510 which is "cut off" on its image frame 560, corresponds to only part of the other regions, and is an example of a candidate damage region appearing only partially in the overlap area. In some cases, this may be enough to determine that the image of the scratch 220, for example, repeats itself in multiple image frames, and that the detected scratch can thus be verified. Note that the above description is a non-limiting example only.

In some examples, the computational cost of verifying candidate target detection regions using spatial detection repetition criteria (across different cameras) is higher than that of using temporal detection repetition criteria (across different capture times). Therefore, in some examples, the system 720 first verifies detected candidate damage regions using one or more temporal detection repetition criteria. This may in some examples winnow out a majority of the "false positives/false alarms", for example 90%, in some cases even 100%. Some false alarms may still exist in some examples, since certain reflections may "follow" the vehicle, appearing in most or almost all of the image frames captured of that portion of the vehicle. The verification system may then take the verified damage regions, which are a smaller number of regions compared to the original candidate regions, and treat them as candidate damage regions that are to be verified. The system may analyze these verified damage regions again, using one or more spatial detection repetition criteria, to further winnow out the verified damage regions, and thus generate doubly-verified damage regions that meet both the temporal and the spatial detection repetition criteria. In some examples, it is more efficient to screen the regions 515, 550 in this order, e.g. comparing image frames 560, 562, 564, 566, rather than first screening using spatial criteria, e.g. first comparing image frames 562, 572, 574, 576, or using both temporal and simultaneously. FIG. 10 discloses an example of such a process. Note that doubly-verified damage regions are a non-limiting example of the more general doubly-verified target detection regions.

Attention is now drawn to FIG. 7, illustrating a generalized example schematic diagram of an inspection, detection and verification system 102, in accordance with certain embodiments of the presently disclosed subject matter. In one non-limiting example, system 102 is a vehicle damage inspection, detection and verification system. In some examples, system 102 comprises imaging system 705. Further details of example architectures of system 705 are disclosed with reference to FIG. 8.

In some examples, system 102 comprises target detection system 710. In the present disclosure, system 710 will be exemplified, for ease of exposition, by a damage detection system 710. In some examples, target detection system 710 receives images 707 from imaging system 705, and detects candidate target detection regions, for example candidate damage regions indicative of detected possible damage to the at least one vehicle. System 710 is in some examples a damage detection system known in the art, and in some examples may utilize machine learning, for example using a deep neural network. In some examples, it is a single-input single-frame damage (or other target) detection system. In other examples, system 710 is a multi-image-inputs single frame target detection system, such as for example system 1210 disclosed with reference to FIG. 12.

In some examples, system 102 comprises target detection verification system 720, for example a damage verification system. System 720 may include a computer. It may, by way of non-limiting example, comprise processing circuitry 730. Processing circuitry 730 may comprise a processor 740 and memory 732. The processing circuitry 730 may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, processing circuitry 730 may be a computer(s) specially constructed for the desired purposes.

In some examples, target detection verification system 720 comprises input interfaces 722. In some examples, interfaces 722 receive, from target detection system 710, information 711 indicative of two or more images of the vehicle, where this information comprises one or more candidate target detection regions. Non-limiting examples of the format of such information are disclosed with reference to the matrix 500 of images of FIG. 5 and data flow 900 of 9. Note that in some examples, target detection system 710 (e.g. system 1210 disclosed further herein with reference to FIG. 12) is comprised within target detection verification system 720. In some examples, interfaces 722 receive motion maps 712, and/or geometric maps 714, from imaging system 705. In some examples, interfaces 722 receive geometric maps 718 from CAD Model 716, in addition to, or instead of, receiving these maps from system 705. In other examples, target detection verification system 720 creates these motion maps (e.g. using a vehicle motion estimation module, not shown in the figure) and/or geometric maps.

Processor 740 may comprise at least one or more function modules. In some examples it may perform at least functions, such as those disclosed in FIGS. 3, 4 and 5, as well as those disclosed further herein with reference to, for example, block 1030 of flowcharts FIGS. 10a and 10b. This includes processing the information 711 indicative of the at least two images, to determine whether each candidate damage region (as a non-limiting example) meets one or more detection repetition criteria. In some cases, this processing also makes use of maps 712, 714, 718. In response to the detection repetition criteria being met, the processor may classify the relevant candidate damage region as a verified damage region.

In some examples, processor 740 comprises overlap determination module 742. This module may be configured to determine which portions of the relevant image frames overlap, that is to determine what are the overlap areas 610, 620. Such a function is visualized schematically in FIG. 6. In some examples, this module makes use of motion maps 712 and/or geometric maps 714, 718.

In some examples, processor 740 comprises region position determination module 742. This module may be configured to determine the relative location of candidate damage regions 515, 550, 325, 463 etc. within their respective images, as well as identifying corresponding regions 510, 520, 535, 327, 468, 467 etc. that are located in a relative position of a data representation of the vehicle that corresponds to the respective candidate damage regions. In some examples, this module makes use of motion maps 712 and/or geometric maps 714, 718.

In some examples, processor 740 comprises damage region verification module 746. This may in some examples compare candidate damage region(s), associated with a particular image, and their corresponding regions associated with other images, and use detection repetition criteria to verify whether the candidate damage region is indicative of actual vehicle damage, or is a false-alarm, such as an indication of reflection. Damage region verification module 746 is a non-limiting example of a more general target detection region verification module 746.

In some examples, damage verification system 720 comprises output interfaces 724. For example, in response to the module 746 classifying the candidate damage region as a verified damage region, the system 720 may output 775 via interface 724 an indication of the verified damage region. Note that indication(s) of verified damage region(s) are one example of the more general indication(s) of verified target detection region(s). For example, the output may be to a display computer 770, viewable by a human operator. In the non-limiting example of the figure, the display 780 on the computer 770 shows an output image, with the now-verified damage/target region 784 highlighted, marked, or otherwise indicated on the output image. The output image can be, for example, the relevant captured image frame (for example 454, 562), or a composite of several captured image frames. In such an example, the operator's attention is easily drawn to the damage 782.

In some examples, the output of the indication includes coordinates associated with the verified target detection region(s). For example, these may be 2-D or 3-D (three-dimensional) coordinates associated with the data representation of the vehicle or other object, that correspond to the damage or other target, e.g. in the reference frame of the data representation. In another example, these are coordinates associated with one or more of the images utilized to verify the target detection region, for example the coordinates of region 535 in the reference frame of 2-D image frame 574.

In another non-limiting example, the interface 724 outputs a text report of verified possible damages and/or other targets, and their locations on the vehicle. The report in some examples may also include an indication of the type of possible damage, e.g. a description of the type of each damage (long scratch, small scratch, dent etc.) and/or other target type (e. g. "label with Company X logo" or "signature of celebrity Y").

In some examples, an indication of classifying the candidate damage region as a verified damage region is not output. Instead, other systems can access this information from a database stored in memory 732, or in a data store (not shown) of verification system 720.

Memory 732 may in some examples store data derived during the processing of image information, and used by the various processing stages. Non-limiting examples of such data include lists of candidate damage regions and of verified damage regions, overlap areas to determine, portions of motion maps 712 and geometric maps 714, 718 that are being used by the modules, calculated positions 310, 410 of candidate damage regions 360, 463 and corresponding regions 327, 468, 460, 467, calculated counts and statistics of repetitions of candidate damage regions etc. In some examples, damage verification system 720 comprises a data store (not shown). One example use is to store data that may be used for later calculations, in a more long-term fashion.

Figure 8:
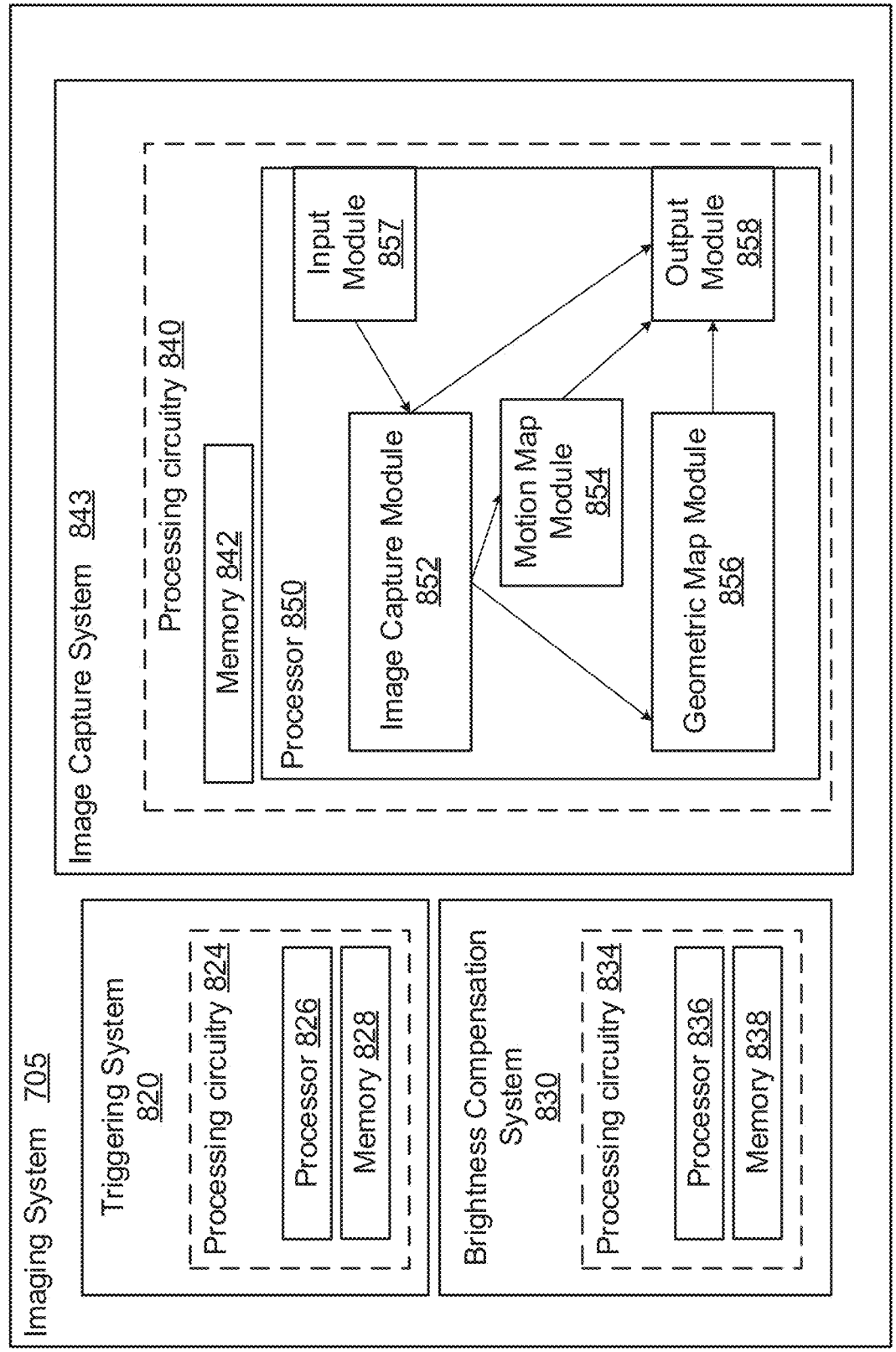
FIG. 8 illustrates a generalized example schematic diagram of an imaging system, in accordance with certain embodiments of the presently disclosed subject matter.

Attention is now drawn to FIG. 8, illustrating a generalized exemplary schematic diagram of an imaging system 705, in accordance with certain embodiments of the presently disclosed subject matter. In some examples, imaging system 705 comprises image capture system 843. In some examples, image capture system 843 comprises processing circuitry 840 that serves as an image capture system. Processing circuitry 840 may comprise a processor 850 and a memory 842.

Processor 850 may in some examples comprise input module 857. This may receive images from imaging devices such as 140, 142. In some cases the images are received in a synchronous fashion. The processor may also comprise image capture module 852. Module 852 may in some examples receive images from input module 857, as indicated by the arrow. Module 852 may adjust each image (e.g. image resolution), associate the image with information such as capture time and image device ID, and possibly store the information and/or image in memory 842.

Processor 850 may, in some examples, comprise motion map module 854, which in some examples may also be referred to herein as vehicle motion estimation module 854. This module may generate motion maps 712, for example as disclosed with reference to block 1015 of FIG. 10. Processor 850 may in some examples comprise geometric map module 856. This module may generate geometric maps 714, for example as disclosed with reference to block 1017 of FIG. 10. In some examples, modules 854 and/or 856 receive images from image capture module 852, as shown by the arrows.

Processor 850 may, in some examples, comprise output module 858. This module may output images, motion maps 712 and/or geometric maps 714, for example to verification system 720.

In some examples, imaging system 705 comprises triggering system 820. In some examples, system 820 comprises processing circuitry 824. Processing circuitry 824 may comprise a processor 826 and a memory 828. In some examples, processor 826 is configured to perform triggering functions such as those disclosed with reference to blocks 1004 and 1013 of FIG. 10. Memory 828 can store, for example, the current triggering state of the system.

In some examples, imaging system 705 comprises image brightness detection or recognition system 830, which detects or recognizes the brightness of the portion of the vehicle being imaged by specific cameras at specific times, and causes imaging adjustments to compensate for the brightness, such as, for example, adjustments in lighting. In some examples, this system 830 is referred to herein also as an image lighting compensation system, or as an image brightness compensation system. In some examples, system 830 comprises processing circuitry 834. Processing circuitry 834 may comprise a processor 836 and a memory 838. In some examples, processor 836 is configured to perform image adjustment functions such as those disclosed with reference to block 1010 and to FIG. 11. Memory 838 can store, for example, the currently-determined degree of brightness of the vehicle being imaged by each camera 140, the current light intensity setting of each illumination device 130, and/or the current exposure/aperture settings of each camera 140.

In the non-limiting example of FIGS. 1, 7 and 8, the imaging devices 140 etc. and the illumination devices 130 etc., as well as monitoring camera 136, are shown as separate from imaging system 705 and as operatively coupled to it. In other examples, these devices are part of the imaging system 705, e.g. as part of image capture system 843. Similarly, in some examples, monitoring camera 136 can be part of triggering system 820 and/or brightness compensation system 830, within imaging system 705.

FIGS. 1, 7 and 8 illustrate only a general schematic of the system architecture, describing, by way of non-limiting example, certain aspects of the presently disclosed subject matter in an informative manner only, for clarity of explanation only. It will be understood that that the teachings of the presently disclosed subject matter are not bound by what is described with reference to FIGS. 1, 7 and 8.

Only certain components are shown, as needed to exemplify the presently disclosed subject matter. Other components and sub-components, not shown, may exist. Systems such as those described with respect to the non-limiting examples of FIGS. 1, 7 and 8, may be capable of performing all, some, or part of the methods disclosed herein.

Each system component and module in FIGS. 1, 7 and 8 can be made up of any combination of software, hardware and/or firmware, as relevant, executed on a suitable device or devices, which perform the functions as defined and explained herein. The hardware can be digital and/or analog. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIGS. 7 and 8. To provide one non-limiting example of this, in some examples there may be separate modules to perform verification based on temporal detection repetition criteria (across different capture times), and based on spatial detection repetition criteria (across different cameras)—rather than using the single module 746. As another example, in some cases, the functions of triggering system 820 and brightness detection system 830 can be combined. As another example, one processing circuitry 840 can provide all the functions disclosed with reference to imaging system 705.

One or more of these components and modules can be centralized in one location, or dispersed and distributed over more than one location.

Each component in FIGS. 1, 7 and 8 may represent a plurality of the particular component, possibly in a distributed architecture, which are adapted to independently and/or cooperatively operate to process various data and electrical inputs, and for enabling operations related to damage detection and verification. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component. Those skilled in the art will readily appreciate that the components of systems 102 and 705, for example, can be consolidated or divided in a manner other than that disclosed herein.

Communication between the various components of the systems of FIGS. 1, 7 and 8, in cases where they are not located entirely in one location or in one physical component, can be realized by any signaling system or communication components, modules, protocols, software languages and drive signals, and can be wired and/or wireless, as appropriate. The same applies to interfaces such as 722, 724, 857, 858. Note also, that the above statements concerning the systems disclosed with reference FIGS. 1, 7 and 8, apply as well to the systems of FIG. 12, mutatis mutandis.

Figure 9:
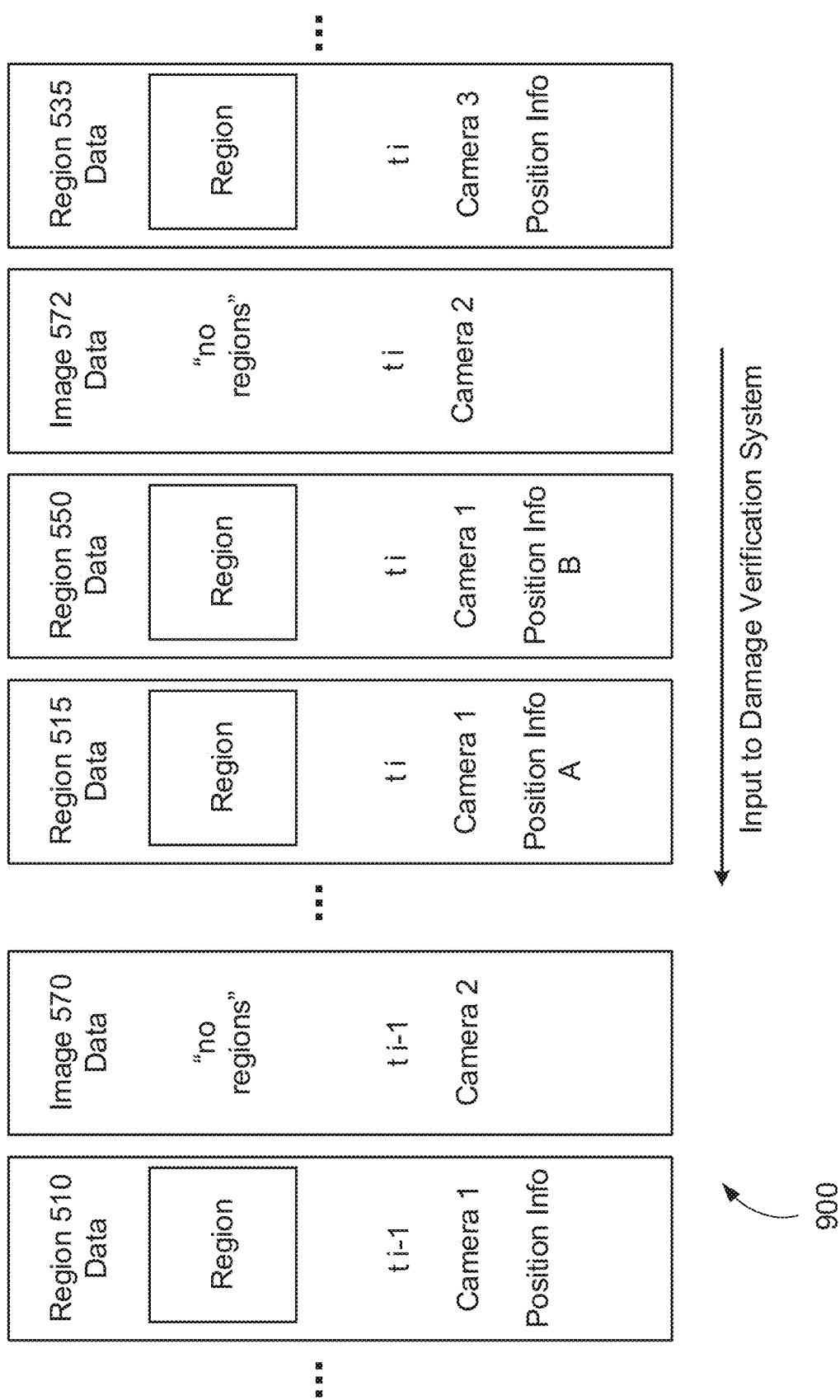
FIG. 9 illustrates a generalized example schematic diagram of data input to a damage verification system, in accordance with certain embodiments of the presently disclosed subject matter.

The non-limiting example of inputting to system 720 a set of image frames, each captured by a particular camera at a particular time, was disclosed with reference to the images matrix 500 of FIG. 5. In one example, the image frames are output by damage detection system 710, including indications of candidate damage regions. In another example, the system 710 outputs only those images where candidate damage regions were detected, while imaging system 705 provides to system 720 the images that do not include candidate damage regions. In one example, the candidate damage regions are indicated on the image itself, e.g. by a defined border. In other examples, the captured images are sent to system 720 untouched, and the system 710 outputs metadata indicative of the candidate damage regions, e.g. their coordinates relative to the image and (in some examples) a description of the associated damage type (e.g. "small vertical scratch"). FIG. 9 discloses still another example implementation of data input to damage verification system 720.

Attention is now drawn to FIG. 9, illustrating a generalized exemplary schematic diagram of data input to damage verification system 720, in accordance with certain embodiments of the presently disclosed subject matter.

In example data flow 900, sets of data are input for each detected candidate damage region. For the candidate regions 510, 515, 550, 535, the data is shown. The example data set also includes the time of capture and the imaging device used (e.g. 510 was captured at $t_{i-1}$ by camera 1). The data set further includes the position information, e.g. coordinates, of the candidate region within its corresponding image frame.

In the non-limiting example of the figure, the data sets for regions 510, 515, 550, 535 include a portion of the image frame itself, corresponding to the relevant candidate region. Note that in this implementation, the entire image 560 need not be sent to verification system 720, but rather only the image of the candidate damage region portion 510. In some examples, this may reduce the amount of data sent to system 720. In some other examples, the position information is sufficient, and the data set may not include images, for some or all candidate damage regions. This may be relevant, for example, where the repetition criteria are concerned only with whether or not some appearances are detected in multiple image frames, and the repetition criteria are not concerned with the particular category or the details of the detected target. For example, in some examples, detection of a scratch above the vehicle wheel in one image frame, and detection in a second image frame of a dent, corresponding to the same location above the wheel, may be considered to meet a repetition criterion, that is the candidate target detection region may be considered to be repeated in multiple image frames.

Note also that in the example of the figure, candidate regions 550 and 515 are sent as separate data sets, with differing relative position information A and B, even though both appear on the same image 562, since the image 562 itself is not input to the system 720.

Similarly, in such an implementation there is, in some examples, a need to send system 720 an indication of the relevant images which contain no candidate damage regions. Thus, data sets are shown for images 570, 572, providing capture camera and time information, and an indication that the particular image is not associated with any detected candidate damage region. In some examples, there is no need to send such data for image frames 570, 572. Rather, system 720 knows which cameras image a particular portion of the object at each point in time. Therefore, if no data is received for e.g. image frame 570, system 720 can infer that Camera 2 did not capture any candidate damage regions associated with that portion of the object during the capture time $t_{i-1}$.

Note that the above description with reference to data flow 900 is a non-limiting example only.

Figure 10A:
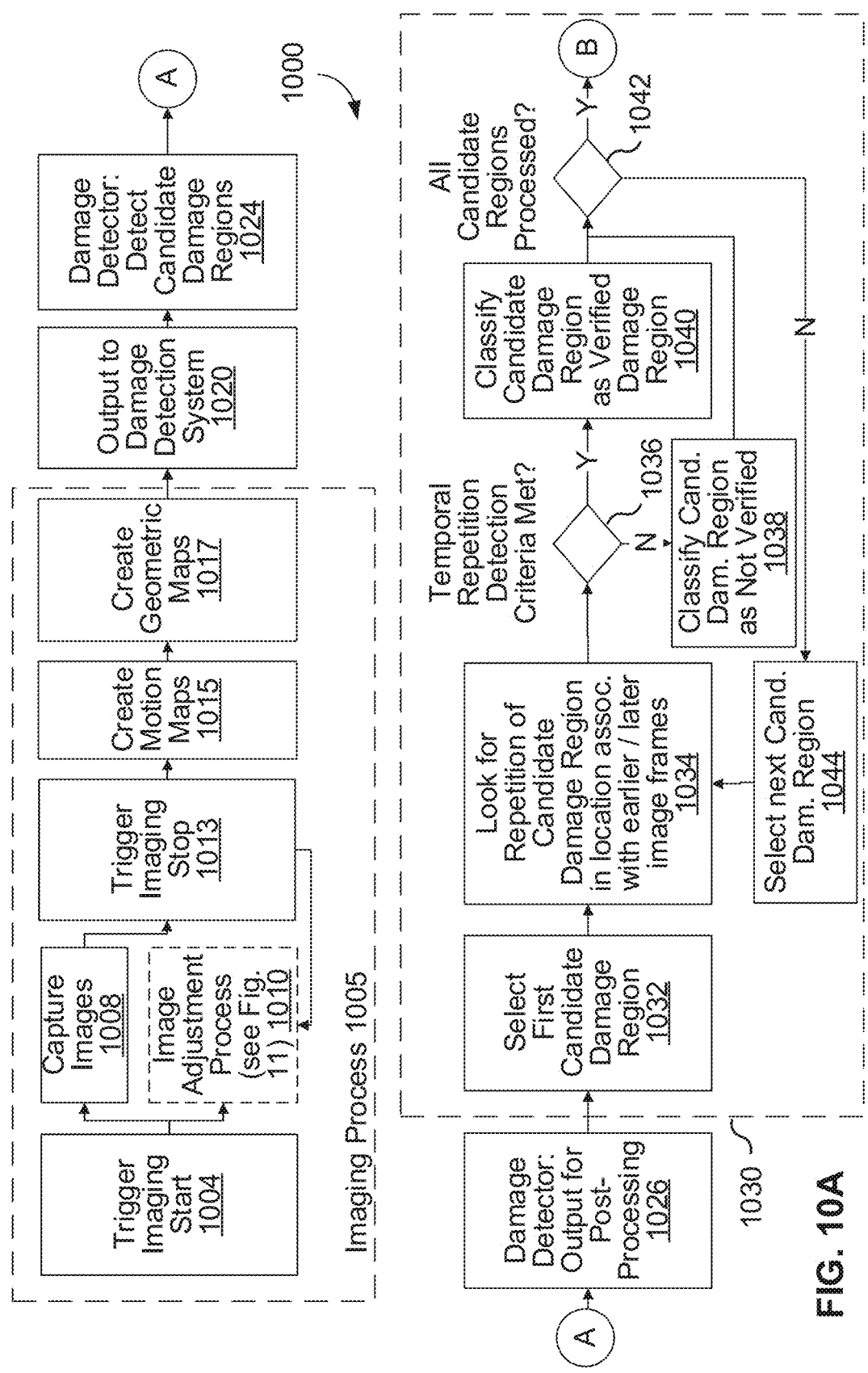
FIGS. 10A and 10B illustrate one example of a generalized flow chart diagram of a process for damage inspection, detection and verification, in accordance with certain embodiments of the presently disclosed subject matter.
Figure 10B:
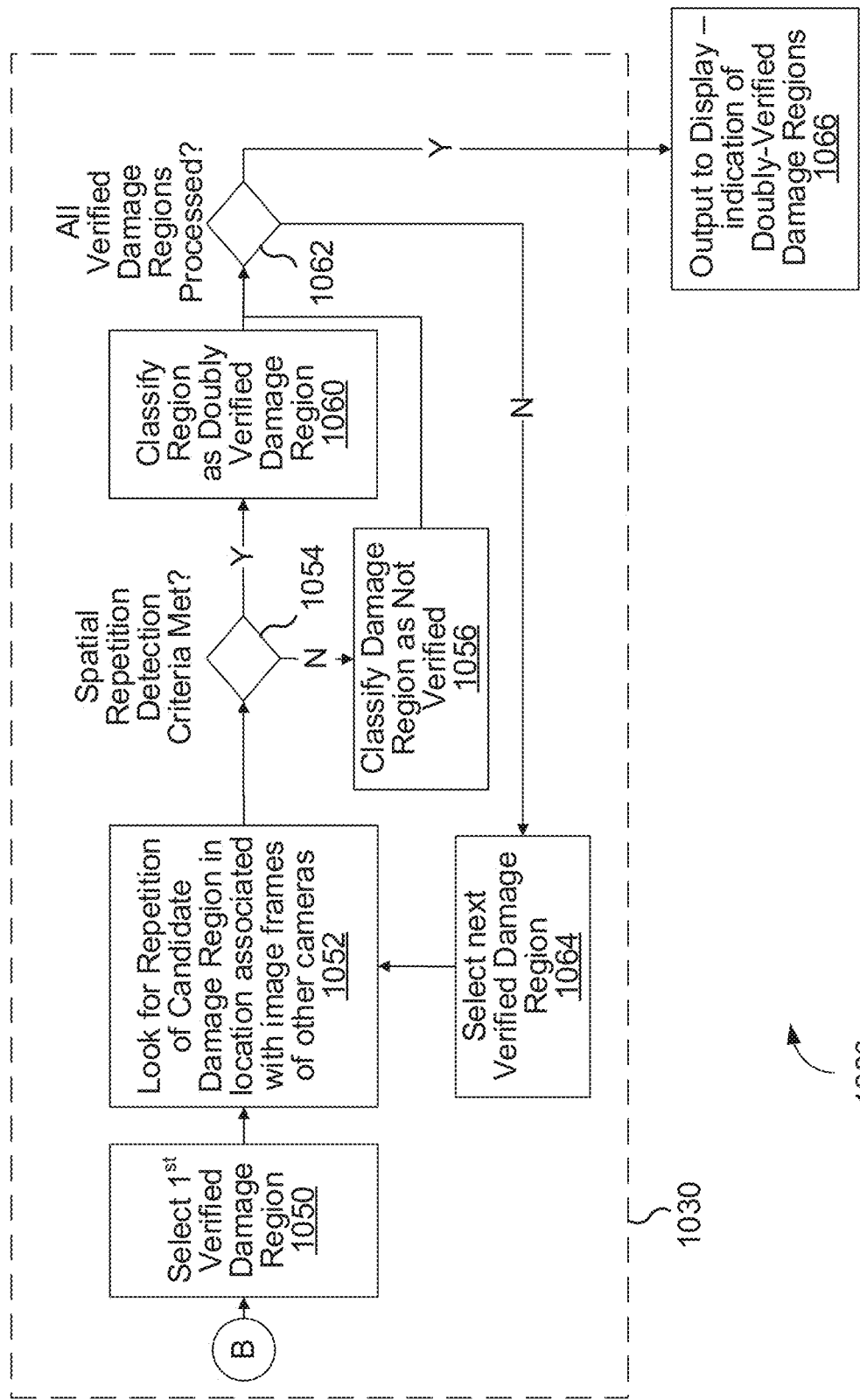
Figure 11:
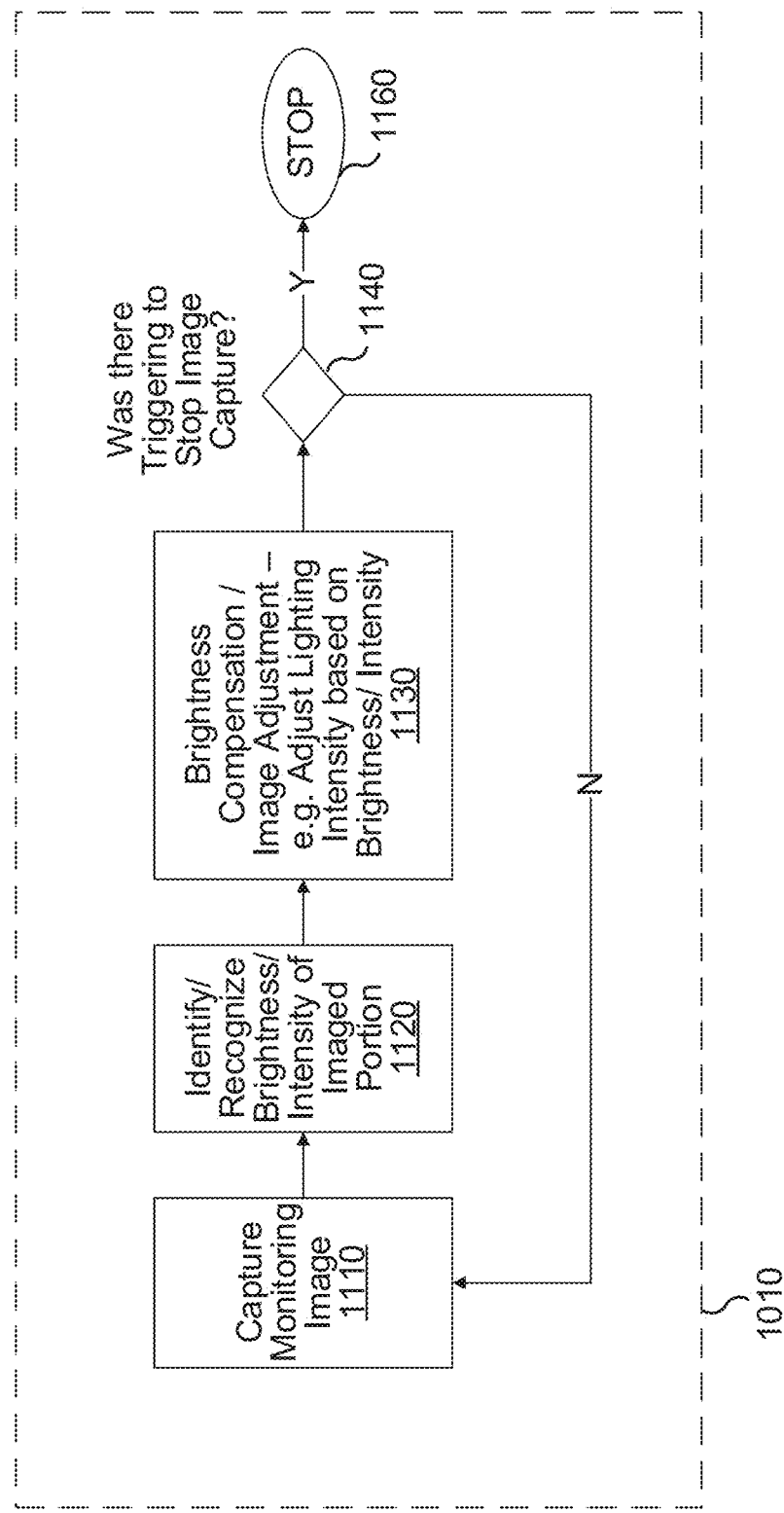
FIG. 11 illustrates one example of a generalized flow chart diagram of a process for image adjustment, in accordance with certain embodiments of the presently disclosed subject matter.
Figure 13:
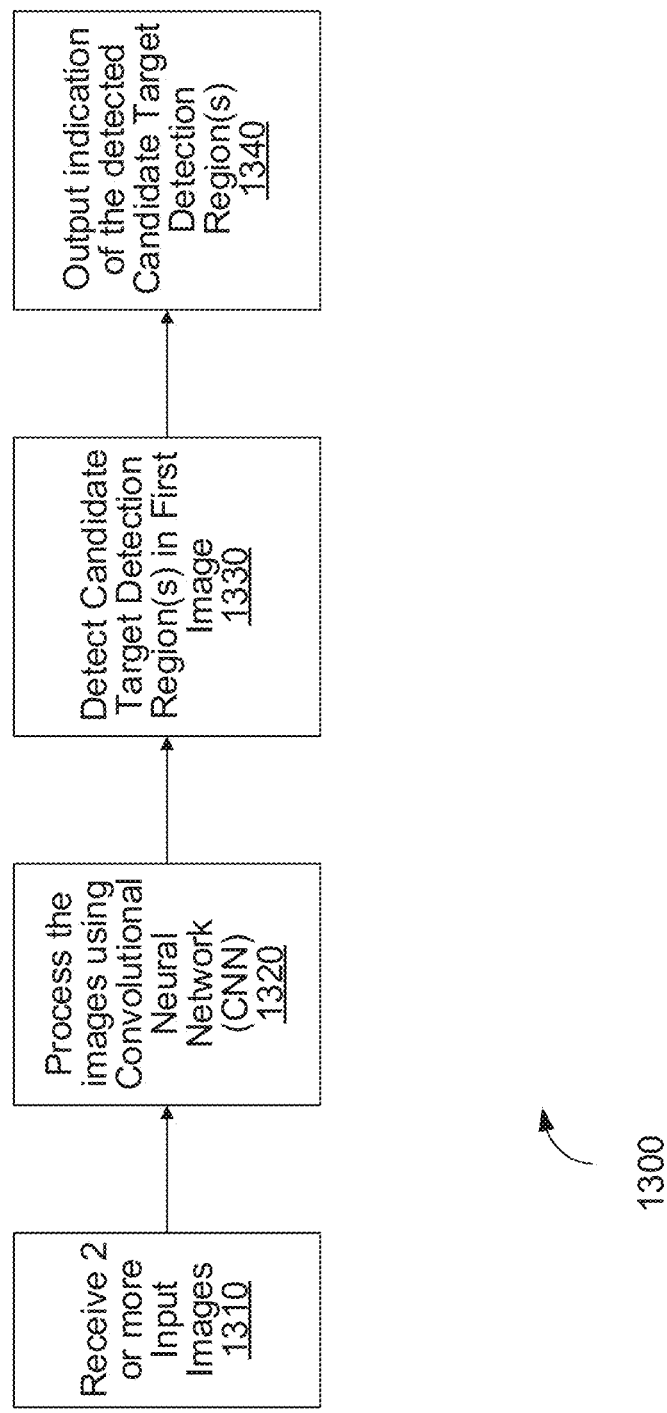
FIG. 13 illustrates one example of a generalized flow chart diagram of a process for target detection, in accordance with certain embodiments of the presently disclosed subject matter.

A number of exemplary flows are disclosed herein. FIGS. 10A and 10B disclose an exemplary method of damage inspection, detection and verification. FIG. 11 discloses an exemplary method for image adjustment and brightness compensation, based on the brightness of the imaged vehicle portion. FIG. 13 discloses a method for damage detection by a multi-frame-input single-frame-output damage detection system.

Attention is now drawn to FIGS. 10A and 10B, illustrating one example of a generalized flow chart diagram of a process 1000 for damage inspection, detection and verification, in accordance with certain embodiments of the presently disclosed subject matter. This process is in some examples carried out by systems such as those disclosed with reference to FIGS. 1, 7 and 8. Damage inspection, detection and verification are disclosed here as one non-limiting example of the more general process of object inspection, and target detection and verification.

At a high level, FIG. 10 can be seen as disclosing five example processes. Imaging process 1005 (blocks 1004-1017) captures images of vehicle 1005, over time, from multiple cameras 140, 142, 146. In block 1024, candidate damage regions are detected. Verification process 1030 discloses two example sub-processes: a stage of verification based on temporal detection repetition criteria (e.g. in blocks 1032-1044), followed by a stage of verification based on spatial detection repetition criteria (e.g. in blocks 1050-1064). Example temporal detection repetition criteria are disclosed also with reference to images 330, 334, 338, images 450, 454 and 458, and images 560, 562, 564, 566, in FIGS. 3-5. Example spatial detection repetition criteria are disclosed also with reference to images 334, 364, images 454, 474, and images 562, 572, 574, 576, in FIGS. 3-5. In the fifth example process, the verified damage regions are output (block 1066).

The flow starts at 1004. According to some examples, and optionally, image acquisition or capture is triggered on (block 1004). For example, processor 826 of triggering system 820 may perform this. Processor 826 may detect an image capture trigger condition, in response to capture of monitoring image(s) by one or more monitoring imaging devices 136. For example, processor 826 may monitor images captured and received from monitoring camera 136. The images may be referred to herein also as monitoring images. In some examples, the image capture trigger condition comprises the vehicle meeting a location condition.

As a non-limiting example of a location condition, when processor 826 sees relative motion of vehicle 105 over vehicle-crossing entry indicator 150, it may trigger on the image acquisition process, and it may instruct image capture module 852 to begin capture of vehicle images using capturing imaging devices 140, 142, 146. In some examples, vehicle-crossing entry indicator 150 comprises a defined line, which has a defined positional relationship with the poles 125, 127, with the cameras such as 140 and with other components of image acquisition system 100.

As another non-limiting example of a location condition, when processor 826 detects relative motion of vehicle 105 into image capture region 155, it may instruct image capture module 852 to begin capture of vehicle image frames. In some examples, the image capture region has a defined positional relationship with the poles 125, 127, the cameras such as 140, and other components of system 100. In some examples, the image capture region 155 has a rectangular shape.

In some examples, the triggering system is configured to distinguish between the vehicle 105 and other objects, such as people, animals and tools that may be brought into the work area of image acquisition system 100. In this way, it will not, for example, trigger image acquisition when a pet dog enters image capture region 155.

According to some examples, the multiple imaging devices 140, 142, 146 capture image frames, sending them to processing circuitry 840 which processes them (block 1008). This is repeated, for example as the vehicle 105 passes through the system 100, or as the imaging devices 140, 142, 146 pass by the vehicle 105. In some examples, the various imaging devices may capture images synchronously.

According to some examples, and optionally, in parallel with block 1008, an image adjustment/brightness compensation process may occur (block 1010). In some examples, this is carried out utilizing brightness detection system 830. Example details of this block are disclosed further herein with reference to FIG. 11.

According to some examples, and optionally, image acquisition or capture is triggered off (block 1013). As one non-limiting example, processor 826 of triggering system 820 may monitor images received from monitoring camera 136. In some examples, when the processor sees relative motion of vehicle 105 over vehicle-crossing exit indicator 157, it may trigger off the image acquisition process, and may instruct image capture module 852 to stop capture of vehicle image frames using capturing imaging devices 140, 142, 146. In other examples, when processor 826 detects relative motion of vehicle 105 out of imaging triggering region or image capture region 155, it may instruct image capture module 852 to stop capture of vehicle images.

One or more motion maps 712 may be created (block 1015). In some examples, this is carried out utilizing motion map module 854. In some other examples, this can be carried out in parallel, building the maps 712 as the image frames are captured in block 1008. In some examples, a motion map 712 is indicative of motion of points on the data representation of the vehicle, e.g. corresponding to points on the vehicle surface, on captured image frames that include those points, over time. As one non-limiting example, a motion map 712 may indicate that the right end of the front door handle appears as pixel number 100 in image frame number 3120, captured by camera 140 at time t, but that the same right end of the handle appears as pixel number 500 in a different image frame number 3121, captured by the same camera 140 at the consecutive point in time t+1.

Motion maps can be derived from the captured image frames, and thus can be associated with the capture of the images. For each imaging session of a vehicle 105, its motion map may be different, since, for example, the driver may drive at a different speed, and make different turns, each time the driver drives the vehicle through image acquisition system 100.

Note that in some examples a different motion map exists for each capturing image device used in the image capture session.

Note that in some other examples, generation of motion maps is carried out by system 720, at a later stage of the flow.

One non-limiting example of generating motion maps 712 is now disclosed.

In some examples, the motion map module 854 analyzes the images to detect known features of the vehicle, such as headlights, grille, side lights, side mirrors, door handles and the recesses around them, the curving lines associated with the border between the front side panel and the front doors, the front and rear doors, and the rear door and the read side panel, etc. It identifies, on images, point(s) indicative of one or more of these features. The positions and orientations of the cameras 140, 142 may be known. By comparing different images that contain the same feature, and considering the position of the particular feature within each image frame, as well as the image capture times, the module can create a map over time of the motion between consecutive image frames of points indicative of the features.

In some examples, based on these maps, the module can also map the motion of other points on the image frames, that are not points indicative of the detected features, for example based on positions of the other points relative to positions of the features. These other points can include, in some cases, areas of the vehicle that are associated with candidate damage regions or with other candidate target detection regions. The module can thus know the position of these other points during the imaging session as a function of time. In some examples, the module can also generate a data representation of the vehicle, based on this information.

Geometric maps 714, or models, of the vehicle may be created (block 1017). In some examples, this is carried out utilizing geometric map module 856. In some other examples, this can be carried out in parallel, building the maps 714 as the images are captured in block 1008. In some examples, the geometric map 714 is indicative of different relative positions of multiple capturing imaging devices 140, 142 and of points on the data representation of the vehicle corresponding to a particular imaged portion of the object.

In some examples, the generation of geometric maps 714 may be done in a manner similar to that disclosed above for motion maps 712, with reference to block 1015, but considering images captured at the same time by multiple cameras 140, 142, 146. In such a case, each geometric map may be associated with a particular time of image capture, for example with the same value of a trigger ID field associated with the image frame. As one non-limiting example, a geometric map 714 may indicate that the right end of the front door handle appears as pixel number 100 in image frame number 4120, captured by camera 140 at time t, but that the same right end of the handle appears as pixel number 500 in a different image frame number 5120, captured by the adjacent camera 142 at the same time t. Note that in some examples a different geometric map exists for each point in time of the image capture session.

Note that in some examples, the use of geometric maps requires at least two imaging devices that are calibrated together, and that there is a known transformation from the coordinates of e.g. camera 142 to the coordinates of camera 140.

Recall that the different capturing imaging devices 140, 142, 146 have known imaging device relative positions and known relative imaging device imaging angles, due to their known position and orientation. Note also that since the vehicle is three-dimensional, each point on it has an associated depth relative to each camera imaging that point. By detecting features on the vehicle, and analyzing where the features appear within the different image frames, and how they appear, the module can determine how each camera views these features, and thus how the cameras view other points on the vehicle at a particular time of image capture. In some examples, the model of the object in the picture is estimated from the image frames using techniques known in the art such as point matching.

In other examples, the geometric maps 718 are predefined, and are known prior to the image acquisition. In some examples this requires registration. Such maps may be based on for example on a CAD model point cloud received 718 from CAD Model 716.

Note that in some other examples, generation of geometric maps is carried out by system 720, at a later stage of the flow.

In some examples, the blocks 1004-1017 may be referred to, together, also as imaging process 1005, carried out for example by imaging system 705, along with the capturing cameras 140, 142, 146, 144, 148, and in some cases with illumination devices 130, 132 and/or monitoring cameras 136.

Captured images, motion maps and/or geometric maps may be output 707, 712, 714 (block 1020). In some examples, this is carried out by output module 858 and output 774. For example, the output may be sent to damage detection system 710.

One or more candidate damage regions may be detected (block 1024). In some examples, this is carried out by damage detection system 710. One non-limiting example of a target detection system is disclosed further herein with reference to system 1210 of FIG. 12, with an example method 1300 disclosed with reference to FIG. 13. The candidate damage region(s) is output for verification, as a post-processing step that follows the detection process (block 1026). The output 711 may be from system 710 to damage verification system 720.

The next blocks, from 1032 to 1064, are in some examples carried out in target detection verification system 720, e.g. a damage verification system. This is indicated by their inclusion in an overall block 1030, indicating the target detection verification process carried out e.g. in damage verification system 720. In block 1032, the first candidate damage region is selected, for example region 515.

In block 1034, it is determined whether, in earlier-captured images 338, 458, 560, and/or in later-captured images 330, 450, 564, 566, captured by the same camera 140, corresponding regions 327, 468, 460, 510, 520, 525 show the same damage appearance 325, 425 as appears in candidate damage region 360, 463, 515, that is whether there is repetition of the particular candidate damage region 360, 463, 515, 550 in locations of these image frames 338, 458, 560, 330, 450, 564, 566 that are associated with the same location on a data representation of the vehicle, as does the candidate damage region 360, 463, 515. Such a determination 1034 may consider temporally-varying image frames. This block may include use of the overlap determination module 742, to determine overlap areas 610, 620, within which repetitions of the candidate damage region will be sought. (Overlap areas are further disclosed with reference to FIG. 6.) This block may also use region position determination module 744, to determine the position (e.g. 310, 410) within each of the other images 338, 330, 458, 450 where the candidate damage region 360, 463 should appear. The block 1034 may also use damage region verification module 746, to perform statistics on the number of repetitions found for the particular candidate damage region 360, 463, 515, 550. Examples of such region matches, choice of other image frames 338, 330, 458, 450, 560, 564, 566 to process and temporal detection repetition criteria, are disclosed with reference to FIG. 5. Example temporal detection repetition criteria are disclosed also with reference to images 330, 334, 338, images 450, 454 and 458, and images 560, 562, 564, 566, in FIGS. 3-5.

In some examples, block 1034 utilizes motion maps 712 to determine the positions of the portion of the vehicle(s) that is associated with the image frames being processed. The motion maps may be used as well, in some examples, when determining overlap areas 610, 620 (further disclosed with reference to FIG. 6), using for example overlap determination module 742.

The following is one non-limiting example of a method for determining 1034 the position 310, 410 within each of the other image frames 338, 330, 458, 450 of the images being used in the verification, where the candidate damage region 360, 463, 515, 550 (associated with a first image frame 334, 454, 562 of the images being used in the verification) should appear, while utilizing a motion map 712, within the process of block 1034, carried out for example by region position determination module 744:

i. determine the positions of the portion of the data representation of the vehicle 105 that is associated with the images 334, 338, 330, 454, 458, 450 being compared, and determine the different relative positions 230, 234, 238, 250, 254, 258 of the capturing imaging devices associated with the image frames and the imaged portion of the object associated with the image frames. This determination, in some examples, is based, at least, on information indicative of the capturing imaging device 140 associated with the each image of two or more images 334, 338, 330, 454, 458, 450 (e.g. the camera IDs associated with each image), on the positions and the orientations of the capturing imaging device(s) 140, and on the motion map(s) 712;

ii. determine a position (e.g. 310, 410) of the candidate damage region 360, 463, 515, 550 with respect to a position of that portion of the data representation of the vehicle which is associated with the first image frame 334, 454, which includes the candidate damage region. This position of the candidate damage region 360, 463 is also referred to herein as the first relative position 310, 410;

iii. determine one or more expected relative positions (e.g. 310, 410) of one or more expected corresponding candidate damage regions 327, 468, 460 on other image frames 338, 330, 458, 450 (not the first image 334, 454). This determination may be based at least on the positions of that portion of the data representation of the vehicle 105 that is associated with the images 334, 338, 330, 454, 458, 450 being processed, on the different relative positions 230, 234, 238, 250, 254, 258 of the capturing imaging device(s) associated with the images and the imaged portion of the object associated with the images, and on the first relative position (e.g. 310, 410) of the candidate damage region 360, 463, 515, 550. In some examples this may make use of the motion map(s) 712; and iv. determining whether the expected corresponding candidate damage region(s) appears on some or all of the other images at the expected relative position(s) (e.g. 310, 410). For example, at 468, 460 the expected corresponding candidate damage region appears, while at 327 the expected corresponding candidate damage region does not appear.

In the above process, as was indicated earlier, candidate damage regions are disclosed as an example of the more general candidate target detection regions.

Note that in some examples, the determination, in block 1034, whether there is repetition of the particular candidate damage region in locations of these images that are associated with the same location on a data representation of the vehicle as does the candidate damage region, implies that the damage appearances 325, 425 are in the same location (e.g. 310, 410) within a certain tolerance. The size of the tolerance is in some cases based on factors such as, for example, rate of image frame capture, level of synchronization between cameras 140, 142, speed of vehicle or system movement 110, 180, size and resolution of image frames 334, 338, 330, 454, 458, 450, size of damage areas 325, 425 to be detected and verified (e.g. giant scratches vs small pits in paint) and distances and angles 230, 234, 238, 250, 254, 258 of cameras relative to the imaged portion of the vehicle. In some examples, the tolerance is dependent on the amount of movement of the object between adjacent image frames. In some non-limiting examples, this tolerance is in the order of magnitude of millimeters. In some examples, the tolerance is dependent on the desired sensitivity of the system, that is the tolerance of the application to having a larger or smaller percentage of false positive detections. In some other non-limiting examples, this tolerance is a few cm.

In block 1036, it is determined whether the relevant temporal detection repetition criteria are met. This may, in some examples, be performed by damage region verification module 746. A non-limiting example criterion is that the candidate damage region 360, 463, 515, 550 appears in the relevant location (e.g. 310, 410) in both the previous image 338, 458, 560 and the following image 330, 450, 564 that was captured by the same camera 140 that captured the candidate region 360, 463, 515, 550. In response to determination that the criteria are not met, the module may classify the particular candidate damage region 360, 550 as not verified (block 1038). In response to determination that the criteria are met, the damage region verification module 746 may classify the particular candidate damage region 463, 515 as verified (block 1040). These classifications could for example be stored in memory 732.

A determination may be met whether all candidate damage regions 515, 550 have been processed for verification (block 1042). In response to determination that not all have been processed, the next candidate damage region 550 may be selected for processing (block 1044). This may in some examples be performed by damage region verification module 746. The process loops back to block 1034.

In response to determination that all candidate damage regions 515, 550 have been process and evaluated, the process may continue to block 1050. In 1050, a first temporally-verified damage region 463 is selected, e.g. by processor 740, to constitute a candidate damage region 463 for further verification.

In block 1052, it is determined whether, in image frames 474, 572, 574, 576, captured at the same time by other cameras 142, 146, corresponding regions 535, 540 show the same damage appearance 425 as appears in temporally-verified candidate damage region 474, 515, that is whether there is repetition of the particular candidate damage region 463, 515 in locations of these images 474, 572, 574, 576 that are associated with the same location on a data representation of the vehicle 105 as does the candidate damage region 463, 515. Such a determination 1052 may consider spatially-varying image frames, taken by other cameras 142, 146. This block may include use of the overlap determination module 742, to determine overlap areas 610, 620, within which repetitions of the candidate damage region 463, 515 will be sought. Overlap areas are further disclosed with reference to FIG. 6.) This block may also use region position determination module 744, to determine the position (e.g. 410) within each of the other image frames 474, 572, 574, 576 where the candidate damage region 463, 515 should appear. The block may also use damage region verification module 746, to perform statistics on the number of spatial repetitions found for the first temporally-verified candidate damage region 515. Examples of such region matches, choice of other image frames to process, and spatial detection repetition criteria, are disclosed with reference to FIG. 5. Example spatial detection repetition criteria are disclosed also with reference to images 334, 364, images 454, 474, and images 562, 572, 574, 576, in FIGS. 3-5.

i. In some examples, the positions of the portion of the vehicle associated with the processed image frames, are determined utilizing geometric map(s) 714, 718. For example, assume that cameras A and B (e.g. 140, 142) capture at the same moment image frames Fa (a first image frame) and Fb (a second image frame), respectively. Assume that in each of these two frames there is a single target detection in the overlap area, denoted Da and Db respectively. In some examples, the method may proceed as follows: transform the coordinates of the first candidate detection region Da, which are in the coordinate system first imaging device A, to the coordinate system of a second imaging device, camera B, using the known calibration and the geometric map model.

ii. compare the transformed coordinates of first candidate detection region Da to the coordinates of the second candidate detection region Db on the object of interest.

In block 1054, it is determined whether the relevant spatial detection repetition criteria are met. This may, in some examples, be carried out by damage region verification module 746. A non-limiting example criterion is that the candidate damage region 463, 515 also appears in the relevant location (e.g. 410) in image frames 474, 572, 574, 576 of two nearby-positioned cameras 142, 146, that were captured at the same time 206 that the image 454, 562 containing the candidate region 463, 515 was captured. In the example above, the system may determine whether the two sets of coordinates Da (transformed coordinates of the first candidate detection region) and Db (coordinates of the second candidate detection region) match, within a defined tolerance.

In response to determination that the criteria are not met, the module may classify the particular candidate damage region 463, 515 as not verified, in that the spatial verification failed (block 1056). In some examples, the region 463, 515 could be classified as e.g. "partially verified", or "temporally-only-verified"—in that the region passed the temporal criteria of block 1036, but failed the spatial criteria of block 1054. This classification could for example be stored in memory 732.

In response to determination that the spatial criteria are met, the damage region verification module 746 may classify the particular candidate damage region as a doubly verified damage region (block 1060). It can be classified as being a spatially-verified damage region as well as a temporally-verified damage region. This indication could for example be stored in memory 732.

A determination may be met whether all temporally-verified candidate damage regions 463, 515, that is candidate damage regions verified at block 1036, have been processed for verification (block 1062). In response to determination that not all have been processed, the next temporally-verified candidate damage region 515 may be selected for processing (block 1064). This may in some examples be carried out by damage region verification module 746. The process loops back to block 1052.

In response to determination that all temporally-verified candidate damage regions 463, 515, have been processed and evaluated, the process may continue to block 1066. In block 1066, one or more of the doubly-verified damage regions 463, 515 are output 775, e.g. by output interface 724, to an external system such as display system 770, for display 780 (e.g. to a human operator).

Note also, that, for ease of exposition, the figure discloses the non-limiting example of first verifying for temporal detection repetition criteria, e.g. in blocks 1032-1044, and only then verifying based on spatial detection repetition criteria, e.g. in blocks 1054-1064. Similarly, in the example process of FIG. 10 the candidate damage regions 360, 463, 515, 550 are processed one a time. In other examples, the spatial criteria 1054 can be applied before application of the temporal criteria 1036. In still other examples, only a single verification stage is carried out. For example, a mix of temporal 1036 and spatial 1054 detection repetition criteria can be applied, concurrently. Also note that in some examples more than one candidate damage region 360, 463, 515, 550 can be processed 1030 and verified in parallel, in either or both stages 1032-1044, 1054-1064 of verification (or in the single stage, if relevant). Note also that the above description of process 1000 is a non-limiting example only. In still other examples, only one of temporal criteria and spatial criteria are applied.

Note further, that in the disclosure of blocks 1034-1040 and 1052-1060, the detection repetition criteria are indicative of repetition of candidate target detection region(s) in locations of the multiple image frames that are associated with a same location on the data representation of the object(s). In some other examples, the detection repetition criteria are indicative of repetition of the candidate target detection region(s) in locations of the frames that are associated with different locations on a data representation of the object(s). In such a case, blocks 1034 and 1052 are modified to look for such detection non-repetition criteria. Also in such a case, blocks 1036 and 1054 are modified, in that in response to the relevant detection non-repetition criteria being met, the damage region verification module 746 may classify the particular candidate damage region as a non-verified target detection region, e.g. in blocks 1038 and/or

1056. An example of this is a reflection, whose appearance "moves" along the object from frame to frame, as the object moves 202, 204, 208 during the image capture process (temporally), and/or as the object is imaged at the same time by different image capture devices 140, 142 that have different relative positions from the imaged portion of object 105.

Attention is now drawn to FIG. 11, illustrating one example of a generalized flow chart diagram of a process 1010 for image adjustment, in accordance with certain embodiments of the presently disclosed subject matter. Process 1010 in this figure is an exemplary detailed breakdown of the image adjustment/brightness compensation process 1010 in FIG. 10A. This process of image brightness compensation, or image adjustment, is in some examples carried out by systems such as disclosed with reference to FIGS. 1, 7 and 8.

The flow starts at 1110. According to some examples, the at least one monitoring image of an imaged portion of the vehicle is captured (block 1110). In some examples, the capture is by one or more monitoring imaging devices, e.g. monitoring camera 136. The capture may be controlled by processor 836 of brightness detection or recognition system 830, referred to herein also as an image brightness compensation system or a brightness compensation system. In some examples this is carried out by a brightness compensation module (not shown) of processor 836. Note that in the example of FIG. 1, the same monitoring camera 136 captures images for both triggering 1004, 1013 purposes, as well as for brightness recognition in block 1110. In other examples, separate monitoring imaging devices, or separate sets of monitoring imaging devices, are used for each of the two functions.

According to some examples, the brightness of the particular portion of the vehicle, that appears in the monitoring image(s) that was imaged in block 1110, is analyzed, to detect, recognize or identify the relevant level or degree of brightness or intensity (block 1120). In some examples, the recognition is carried out by a monitoring module (not shown) of the processor 836 of brightness compensation system 830.

According to some examples, an imaging adjustment action is carried out based on at least the identified intensity level of the imaged portion of the vehicle (block 1130). In some examples, the adjustment or compensation action is carried out by a brightness compensation module (not shown) of the processor 836 of brightness compensation system 830. In some examples, the brightness compensation module may send instructions to the relevant illumination devices 130, 132 to adjust their intensity, as a function of the brightness or intensity. In some examples, the device is a color camera, rather than a grayscale camera, and the brightness is also associated with the color of the imaged portion. For example, in some examples if the vehicle surface is white, light gray, yellow, light tan, the lighting intensity necessary is less than if the surface is black, dark blue or dark gray.

Another example action is instructing relevant capturing imaging devices 140, 142, 146 to adjust their exposure time—for example a longer exposure time for a relatively dark object portion, e.g. dark gray or darker colors, to allow more total light during the image capture, and a shorter exposure time for a relatively light or bright object portion, e.g. light gray or lighter or brighter colors. In other examples, the module instructs a combination of adjustments to compensate for the brightness or intensity.

Note that the exact adjustment levels to be performed, as a function of the particular vehicle portion brightness, are in some cases dependent on the components and geometries of the particular system 100. For example, the speed of the vehicle movement 110 may in some examples require a relatively short exposure time, to help prevent motion blur.

According to some examples, a determination is made whether there was a trigger indicating that capturing of vehicle images is to stop (block 1140). In some examples, the determination is based on whether trigger 1013 of FIG. 10A occurred. In response to there not occurring such a capture-stop trigger, in some examples the brightness compensation process continues, looping back to block 1110 (block 1150). Capture of monitoring images, brightness identification, and brightness compensation continue, with respect to another imaged portion of the vehicle. This other imaged portion of the vehicle constitutes the imaged portion of the vehicle for the purpose of blocks 1110, 1120, 1130. In some examples, the frequency of performing brightness adjustments is based on the particular parameters of the system 100, including for example vehicle movement speed 110. Note that if a vehicle has mostly one level of brightness, there may be relatively few adjustments. If it has multiple levels of brightness, e.g. the roof has a different color from the body panels, there may be relatively more adjustments.

In response to such a capture-stop trigger, the brightness compensation process stops (block 1160). Note that the above description of block 1010 is a non-limiting example only.

In some examples, such a color compensation process 1010 may have at least certain example advantages. For example, if light of high intensity is aimed at a surface that is white or is of another very light shade, in some cases at least a portion of the captured images will show mostly reflected light, and will show very little content that represents the features on that portion of the vehicle. Such an image may be of little use for functions such as damage detection and verification. A brightness compensation process such as 1010 may in some examples prevent, minimize or ameliorate such undesirable phenomena.

Figure 12:
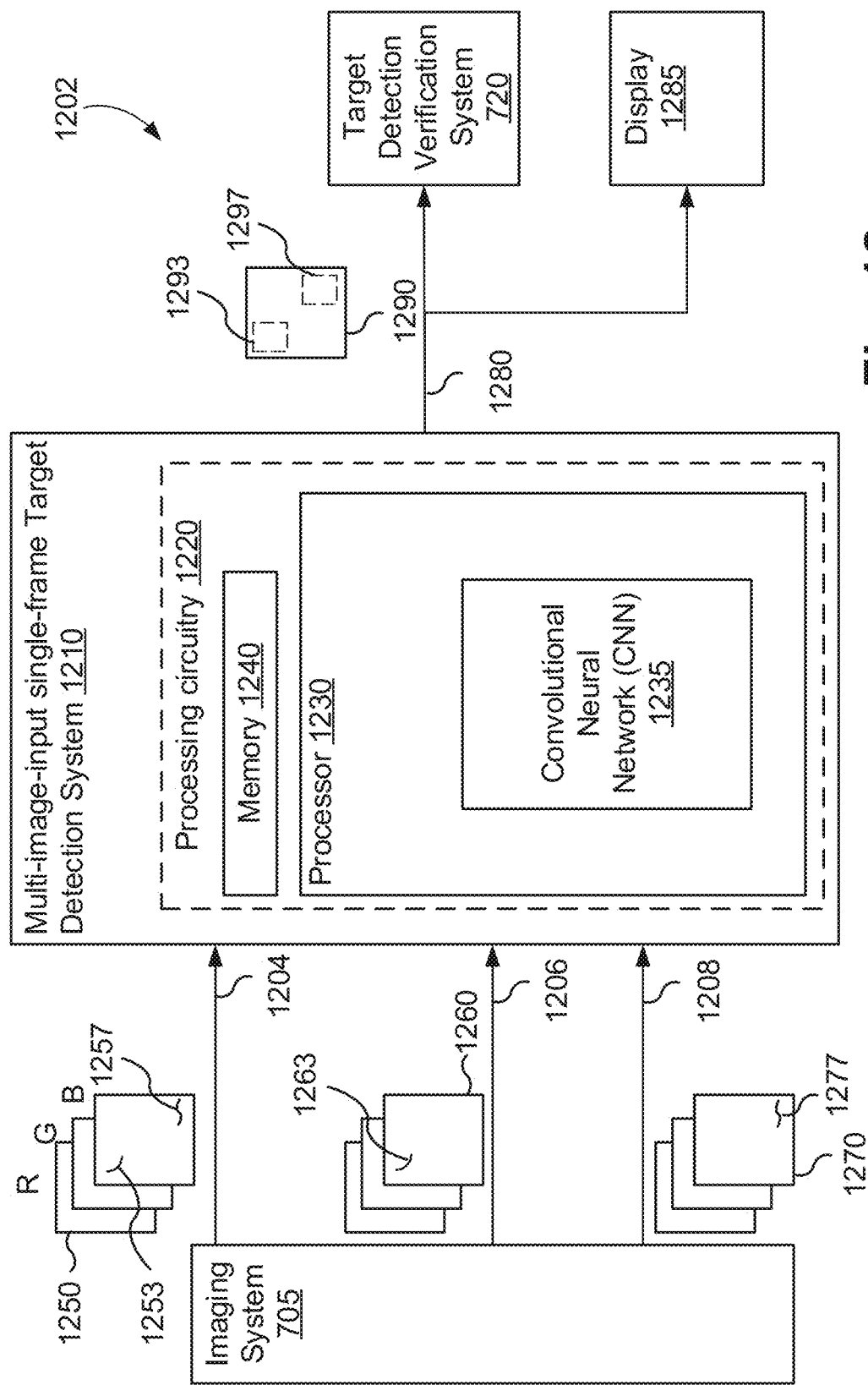
FIG. 12 illustrates a generalized exemplary schematic diagram of a damage detection system, in accordance with certain embodiments of the presently disclosed subject matter.

Attention is now drawn to FIG. 12, illustrating a generalized example schematic diagram of a damage detection system, in accordance with certain embodiments of the presently disclosed subject matter. Damage detection system 1210 is shown within the context of computerized system 1202 for vehicle damage inspection, detection and verification. In some examples, system 1202 may have features similar to that of system 102.

In some examples, system 1202 comprises a multiple-image-input single-frame damage detection system 1210. Note that multiple-image-input single-frame damage detection system 1210 is disclosed herein as one non-limiting example of, more generally, a multiple-image-input single-frame imaged target detection system 1210.

In some examples, multiple-image-input system 1210 may include a computer. It may, by way of non-limiting example, comprise processing circuitry 1220. Processing circuitry 1220 may comprise a processor 1230 and memory 1240. Processor 1230 may in some examples comprise a machine learning functionality such as neural network 1235. Neural network 1235 may in some examples be a deep neural network, for example a convolutional neural network (CNN), as shown in the figure. Neural network 1235 may function to process input captured images, and to detect on them candidate damage regions. In some examples, the processor performs computations associated with the neural network 1235.

Memory 1240 may in some examples store data associated with CNN 1235. As on example, in some embodiments the memory 1240 stores the weights and parameters associated with the neural network 1235.

In some examples, multiple-image-input single-frame damage detection system 1210 receives two or more image inputs, for example the three inputs 1204, 1206 and 1208. The example of the figure shows receipt of three image frames 1250, 1260, 1270. The received image frames are of the vehicle or other object, e.g. still images and/or frames of a video capture. The received images are associated with different relative positions of the relevant capturing imaging device(s) and an imaged portion(s) of the object associated with the image (for example, as disclosed with reference to image matrix 500 of FIG. 5). In some examples, the received input images have at least partial overlap 610, 620. In some examples, the images are color images. In such a case, each image frame may comprise more than one component, for example of a different color. In the example of the figure, each image has three components, e.g. red, blue and green (RGB) components, and thus the inputs 1204, 1206 and 1208 in fact represent nine input channels, each of a different combination of image frame plus color component. Options other than RGB are possible. Similarly, in some examples one or more of the inputs are black and white or grayscale, rather than color.

In some examples, the system 1210 receives on inputs 1204, 1206, 1208, in addition to image frame 1250, 1260, 1270, information indicative of the different relative positions the capturing imaging device(s) associated with the images and an imaged portion(s) of the object. In some examples different relative imaging angles and the different relative imaging positions are associated at least partially with image frames captured at different times. The system 1210 may receive indication of a relative order of capture of each of the multiple images 1250, 1260, 1270. In some non-limiting examples, the system 1210 may receive indication of a time of capture of each of the multiple images. In some examples the different relative positions are associated at least partially with image frames captured by different capturing imaging devices. The system 1210 may in some examples receive indication of relative position of the capturing imaging device associated with each of the multiple images 1250, 1260, 1270. In some non-limiting examples, the system 1210 may receive indication of a capturing imaging device associated with each of the multiple images. In some examples indication is received both of relative orders of capture and of capturing imaging devices.

In some examples, the function of the system 1210 is detect candidate damage region(s) on only one of the input images, for example the image frame received on the first input 1204. This image 1204 on which detection is performed is referred to herein also as the detection image frame, as the detection image, or as the first image frame. In such an example, the images 1260 and 1270, received respectively on second and third inputs 1206, 1208 may be referred to herein also as the non-detection image frames or supporting image frames (or images), as the second image frame. In the example of the figure, for ease of exposition, it is shown that image 1250 and image 1260 show roughly the same scratch or other damage at corresponding locations 1253 and 1263 respectively. Similarly, it is shown that image 1260 and image 1270 show roughly the same scratch or other damage at corresponding locations 1257 and 1277 respectively.

In some examples, the CNN 1235 processes the nine input components, representing the multiple input images, and outputs 1280 a single target output such as, for example, image frame 1290. In some examples, image 1290 also comprises multiple color components. The network can be trained, and verified, using sets of relevant input images. Some of the sets will feature the damage in corresponding regions of all of the second images. In some of the sets, the damage appears in corresponding regions of only some of the second images (e.g. the damage appears in the image of input 1206 but not of 1208, or vice versa). In some of the sets, the damage appears in only some of the corresponding regions (e.g. image 1260 has a correspondence between 1253 and 1263, but has no correspondence for scratch 1257). In some sets, there is only one appearance of the damage. In some sets, there is no damage appearance at all. If the sets used in training are associated with, for example, movement of the object and/or of the imaging devices during capture, the sequence (i.e. relative order) of images in the training sets should be the same sequence as will be used in operation.

When used operationally, the trained neural network 1235 can be used to detect candidate damage region(s) 327, 463, 515, 550, on an operational input detection image frame 1250, 334, 454, where the candidate damage region(s) 327, 463, 515, 550 appears at least partially in an area of the first detection 1250, 334, 454 that is associated with the at least partial overlap 610, 620.

Note that in some cases the ability to detect candidate damage regions is not a function of the degree of overlap. So long as some portion of the candidate damage region is present in one or more of the second, third etc. images (that is, the supporting image frames), in some examples detection may be possible. For example, if it may be possible to perform detection with a 10% overlap, with a 25% overlap, with a 50% overlap etc.

In some examples, use of a multiple-image-input single-frame damage detection system 1210 to detect candidate damage regions may provide at least certain example advantages, as compared to using single-image-input single-frame damage detection systems. Instead of detecting candidate damage regions on the detection image by processing only that detection image in a neural network, a multiple-image-input system such as 1210 detects candidate damage regions on the detection image frame by processing with neural network 1235 a set of multiple image inputs 1204, 1206, 1208, having for example characteristics as disclosed above. In some examples, the additional inputs make for a richer neural network, where the additional input of the second images allow for additional learning per input detection image. For example, in the figure, the network has the scratch 1263 on the second image to provide additional information when attempting to learn that the feature 1253 of the detection image is likely a scratch and should be detected as such. Therefore, in some examples a multiple-image-input single-frame damage detection system 1210 may enable a higher detection accuracy associated with detection of candidate damage regions, as compared to a lower detection accuracy associated with detection of candidate damage regions by a single-image-input single-frame damage detection system. In some examples the required detection accuracy for the particular application is defined in terms of required precision and/or recall scores.

Other examples of advantages include:
A. simultaneously inspecting several occurrences of the same target appearance
B. incorporating spatial information to the detection, which introduces more information to the neural network, information that does not exist in single shot detectors
C. experiments show that such input can reduce false alarms of detections, in some non-limiting example cases, by 50-70%, depending on the application.
D. computational efficiency: processing two or more frames as input to a neural network is more efficient than processing the same inputs separately and then applying post processing such as disclosed with reference to the flow of FIG. 10. In some non-limiting examples, this increase in efficiency is almost by a factor of two.

In some examples, multiple-image-input single-frame target detection system 1210 is one example of the more general target detection system 710 of FIG. 7. Similar to reference 711, in some examples damage target system 1210 can therefore output 1280 indication(s) of detected candidate target detection region(s) such as e.g. detected candidate damage region(s) (e.g. regions 1293 and 1297 in image 1290) for post-processing by target detection verification system 720. In some examples, the indication of the candidate damage region(s) comprises the detection image frame (i.e. first image) 1290. Note that in the example, candidate damage region 1293 corresponds to damage 1253, and candidate damage region 1297 corresponds to damage 1257. System 720 can verify which candidate damage regions received from 1210 are in fact indicative of actual damage to the vehicle. Non-limiting examples of formats for the output 1280 indication are disclosed further herein with reference to image matrix 500 of FIG. 5 and data flow of FIG. 9. In other non-limiting examples, output 1290 is a list of coordinates of candidate detection regions 1293, 1297. Other non-limiting examples are output formats similar to those disclosed with reference to output interface 724 in FIG. 7.

In some examples, indication(s) of candidate damage region(s) (e.g. regions 1293 and 1297 in image 1290) can be output 1280 to display 1285, for display to a user or operator. Note that indication(s) of candidate damage region(s) are one example of the more general indication(s) of candidate target detection region(s). In some examples, the indication of the candidate damage region(s) comprises the detection image 1290. In some examples, the candidate damage region(s) is marked, highlighted or otherwise indicated on the detection image 1290. In some examples, display 1285 may be the same as, or similar to, display 770. In some other examples, only coordinates of the candidate damage region (s) are output, without outputting the image frame. In some non-limiting examples, the indication of a candidate damage region comprises an indication of a type of possible damage associated with the candidate damage region. In some other examples, the indication of a candidate target detection region comprises an indication of a type of possible target associated with the candidate target detection region, e.g. "label with Company X logo" or "signature of celebrity Y".

In some examples, system 1210 can output 1280 to both 720 and 1285. Note that the input and output interface modules of system 1210 are not shown in the figure, for simplicity of exposition. Note also that the above description with reference to system 1202 is a non-limiting example only.

In some examples, the post-processing shown in the figure may have at least certain example advantages. For example, even though in some examples detection of candidate damage regions by a multiple-image-input single-frame damage detection system 1210 can be done with higher accuracy than detection by a single-image-input single-frame damage detection system, and may provide for the accuracy required of the particular application, the verification process performed by damage verification system 720 can provide verification of such detected candidate damage regions, using for example methods disclosed with reference to block 1030 of FIG. 10. This therefore in some cases may further increase the accuracy of the detection, in that only regions that are verified by system 760 are output 1280 to the user.

Another example advantage is that the multi-frame detector system 1210 has limited input, according to the network configuration. One non-limiting example is three frames input, as disclosed in FIG. 12. Applying post-processing enables combining several results of detection, from frames which are not visible to a single multi-frame detector 1210, for example combining results of frames 1-2-3 with those of 2-3-4. In this way, expanding the coverage of multi-frame information can be possible.

Attention is now drawn to FIG. 13, illustrating one example of a generalized flow chart diagram of a process 1300 for target detection, in accordance with certain embodiments of the presently disclosed subject matter. This process is in some examples performed by systems such as disclosed with reference to FIG. 12. The disclosure here will exemplify target detection by damage detection.

The flow starts at 1310. According to some examples, two or more images 1250, 1260, 1270 are received, via two or more image inputs 1204, 1206, 1208 (block 1310). In some examples, this is done by multiple-image-input system 1210. In some examples, the images have at least partial overlap 610, 620, and each of the images received within the set is associated with different relative imaging angles and with different relative imaging positions.

According to some examples, the received two or more images are processed (block 1320). In some examples, this is done by multiple-image-input system 1210. In some examples this is done utilizing convolutional neural network 1235.

According to some examples, candidate damage region(s) are detected on the detection image 1250 (block 1330). In some examples, this is done by multiple-image-input system 1210. In some examples this is done utilizing convolutional neural network 1235.

According to some examples, an indication of the candidate damage region(s) is output 1280 (block 1340). In some examples, this is done by multiple-image-input system 1210. The output may be, in some examples, to system 720 and/or to system 1285.

Note that the above description of process 1300 is a non-limiting example only. In some embodiments, one or more steps of the various flowcharts exemplified herein may be performed automatically. The flow and functions illustrated in the various flowchart figures may for example be implemented in systems 102, 705, 720, 820, 830, 843 and 1210 and processing circuitries 730, 824, 834, 840, and 1220, and may make use of components described with regard to FIGS. 1, 7, 8 and 12.

It is noted that the teachings of the presently disclosed subject matter are not bound by the flowcharts illustrated in the various figures. The operations can occur out of the illustrated order. For example, steps 1015 and 1017, shown in succession can be executed substantially concurrently, or in a different order. Similarly, some of the operations or steps can be integrated into a consolidated operation, or can be broken down to several operations, and/or other operations may be added. As one non-limiting example, in some cases blocks 1032 and 1034 can be combined.

It is also noted that whilst the flowchart is described with reference to system elements that realize steps, such as for example systems 102, 705, 720, 820, 830, 843 and 1210 and processing circuitries 730, 824, 834, 840, and 1220, this is by no means binding, and the operations can be carried out by elements other than those described herein.

In embodiments of the presently disclosed subject matter, fewer, more and/or different stages than those shown in the figures can be executed. In embodiments of the presently disclosed subject matter one or more stages illustrated in the figures can be executed in a different order and/or one or more groups of stages may be executed simultaneously.

In the claims that follow, alphanumeric characters and Roman numerals, used to designate claim elements such as components and steps, are provided for convenience only, and do not imply any particular order of performing the steps.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system configured for verification of imaged target detection, comprising a processing circuitry and configured to perform the following:
   (a) receive information indicative of at least two images of at least one object, wherein the information indicative of the at least two images comprises at least one candidate target detection region, the at least one candidate target detection region indicative of possible detection of a target of interest associated with the at least one object, wherein the at least two images have at least partial overlap, constituting an overlap area, wherein the at least one candidate target detection region appears at least partially in the overlap area, wherein the at least two images are associated with different relative positions of at least one capturing imaging device associated with the at least two images and of an imaged portion of the object associated with the at least two images;
   (b) process the information indicative of the at least two images to determine whether the at least one candidate target detection region meets at least one detection repetition criterion, the at least one detection repetition criterion being indicative of repetition of the at least one candidate target detection region in locations of the at least two images that are associated with a same location on a data representation of the at least one object; and
   (c) in response to the at least one detection repetition criterion being met, classify the at least one candidate target detection region as at least one verified target detection region,
   thereby facilitating output of an indication of the at least one verified target detection region.

2. The system of claim 1, wherein the information indicative of the at least two images comprises at least one of: information indicative of a time of capture of each image of the at least two images; information indicative of the at least one capturing imaging device associated with the each image of the at least two images; relative positions of the at least one candidate target detection region on each image of the at least two images.

3. The system of claim 1, wherein the at least two images comprises three images.

4. The system of claim 1, wherein the at least one detection repetition criterion comprising a temporal detection repetition criterion, wherein the different imaging positions of the at least one capturing imaging device and of the imaged portion of the object are associated at least partially with images captured at different times.

5. The system of claim 4, wherein the images captured at different times are temporally-consecutive captured images.

6. The system of claim 4, wherein the temporal detection repetition criterion is indicative of at least one motion map.

7. The system of claim 6, wherein said step (b) comprises:
   i) determine positions of a portion of the data representation of the at least one object associated with the at least two images and the different relative positions of the at least one capturing imaging device associated with the at least two images and the imaged portion of the object associated with the at least two images, based at least on the information indicative of the capturing imaging device associated with the each image of the at least two images, positions of the at least one capturing imaging device, orientations of the at least one capturing imaging device and the at least one motion map;

ii) determining at least one first relative position of the at least one candidate target detection region with respect to a position of the portion of the data representation of the at least one object associated with the first image;

iii) determine at least one expected relative position of at least one expected corresponding candidate target detection region on other images of the at least two images, the other images not comprising the first image, wherein the determination is based on at least the positions of the portion of the data representation of the at least one object associated with the at least two images, the different relative positions of the at least one capturing imaging device associated with the at least two images and the imaged portion of the object associated with the at least two images, the at least one first relative position of the at least one candidate target detection region and the at least one motion map; and iv) determining whether the at least one expected corresponding candidate target detection region appears on other images of the at least two images at the at least one expected relative position.

8. The system of claim 1, wherein the at least one detection repetition criterion comprising a spatial detection repetition criterion, wherein the different relative positions of the at least one capturing imaging device and of the imaged portion of the object being associated at least partially with images captured by different capturing imaging devices.

9. The system of claim 8, wherein the spatial detection repetition criterion is indicative of at least one geometric map.

10. The system of claim 9, wherein the least one geometric map is based at least on a CAD model point cloud.

11. The system of claim 8, wherein the different capturing imaging devices are configured to capture images substantially synchronously.

12. The system of any claim 8, wherein the different capturing imaging devices have known imaging device relative positions and known relative imaging device imaging angles.

13. The system of claim 4, wherein in said steps (b) and (c), the temporal detection repetition criterion constitutes the at least one detection repetition criterion, the method further comprising:
(d) setting the at least one verified target detection region to constitute the at least one candidate target detection region; and
(e) repeating said steps (b) and (c), wherein a spatial detection repetition criterion constitutes the at least one detection repetition criterion,
thereby generating a doubly-verified target detection region.

14. The system of claim 1, wherein the information indicative of the at least two images comprises the at least two images.

15. The system of claim 1, wherein the information indicative of at the least two images comprises an indication that at least one image of the at least two images is not associated with any candidate target detection region of the at least one candidate target detection region.

16. The system of claim 1, the method further comprising performing, after said step (c), the following:
(f) in response to classifying the at least one candidate target detection region as at least one verified target detection region, outputting the indication of the at least one verified target detection region.

17. The system of claim 16, wherein the indication comprises at least one of coordinates associated with the at least one verified target detection region, the coordinates being associated with one of the data representations of the at least one object and an image of the at least two images.

18. The system of claim 1, wherein in said step (a) the receiving the information indicative of at least two images comprises receiving from a target detection system.

19. The system of claim 18, the method further comprising, performing, prior to said step (a), the following:
(g) detecting, by the target detection system, the at least one candidate target detection region.

20. The system of claim 18, wherein the at least one capturing imaging device comprises a camera.

21. The system of claim 19, wherein the at least one object moves during capture of the at least two images.

22. The system of claim 21, wherein a path movement of the at least one object is unconstrained.

23. The system of claim 19, wherein the at least one capturing imaging device moves during capture of the at least two images.

24. The system of claim 19, the method further comprising, performing, prior to said step (g), the following:
(h) capturing the at least two images by the at least one capturing imaging device.

25. The system of claim 24, wherein the capturing of the at least two images is performed in response to detection by a triggering system of an image capture trigger condition, the triggering system comprising at least one monitoring imaging device,
wherein detection of the image capture trigger condition is performed in response to capture of at least one monitoring image by the at least one monitoring imaging device,
wherein the image capture trigger condition comprises the object meeting a location condition.

26. The system of claim 25, wherein the triggering system is configured to distinguish between the at least one object and other objects.

27. The system of claim 26, wherein the other objects comprise at least one of people, animals and tools.

28. The system of claim 25, wherein the location condition comprises the object entering an image capture region, the image capture region having a defined positional relationship with the image acquisition system.

29. The system of claim 25, wherein the location condition comprises the object crossing a defined line, the defined line having a defined positional relationship with the image acquisition system.

30. The system of claim 1, wherein, in response to the at least one candidate target detection region being indicative of a reflection of light from the object, in said step (b) the at least one candidate target detection region does not meet the at least one detection repetition criterion.

31. The system of claim 1, wherein the at least one object comprises a vehicle.

32. The system of claim 1, wherein the at least one candidate target detection region comprises at least one candidate damage region, the at least one candidate damage region indicative of detected possible damage to the at least one object.

33. The system of claim 32, wherein the possible damage to the at least one object comprises at least one of a scratch and a dent.

34. A multiple-image-input single-frame imaged target detection and detection verification system, comprising a processing circuitry and configured to perform the following:
1) receive, via at least two image inputs of the multiple-image-input single-frame imaged target detection system, at least two images of at least one object, wherein the at least two images have at least partial overlap,
wherein the at least two images are associated with different relative positions of at least one capturing imaging device associated with the at least two images and an imaged portion of the object associated with the at least two images;
2) process the at least two images, to detect at least one target detection region, the at least one target detection region indicative of detection of a target of interest associated with the at least one object,
wherein the at least one target detection region is associated with a detection image of the at least two images,
wherein the at least one target detection region appears at least partially in an area of the detection image that is associated with the at least partial overlap;
3) receive information indicative of the at least two images of the at least one object, wherein the information indicative of the at least two images comprises the at least one target detection region, wherein the at least two images have at least partial overlap, constituting an overlap area, wherein the at least one target detection region appears at least partially in the overlap area,
wherein the at least two images are associated with different relative positions of at least one capturing imaging device associated with the at least two images and of an imaged portion of the object associated with the at least two images;
4) process the information indicative of the at least two images to determine whether the at least one target detection region meets at least one detection repetition criterion, the at least one detection repetition criterion being indicative of repetition of the at least one target detection region in locations of the at least two images that are associated with a same location on a data representation of the at least one object; and
5) in response to the at least one detection repetition criterion being met, classify the at least one target detection region as at least one verified target detection region,
thereby facilitating output of an indication of the at least one verified target detection region.

35. A computer-implemented method of verification of imaged target detection, the method comprising, using a processing circuitry of a target detection verification system to perform the following:
(a) receive information indicative of at least two images of at least one object, wherein the information indicative of the at least two images comprises at least one candidate target detection region, the at least one candidate target detection region indicative of possible detection of a target of interest associated with the at least one object, wherein the at least two images have at least partial overlap, constituting an overlap area, wherein the at least one candidate target detection region appears at least partially in the overlap area,
wherein the at least two images are associated with different relative positions of at least one capturing imaging device associated with the at least two images and of an imaged portion of the object;
(b) process the information indicative of the at least two images to determine whether the at least one candidate target detection region meets at least one detection repetition criterion, the at least one detection repetition criterion being indicative of repetition of the at least one candidate target detection region in locations of the at least two images that are associated with a same location on a data representation of the at least one object; and
(c) in response to the at least one detection repetition criterion being met, classify the at least one candidate target detection region as at least one verified target detection region,
thereby facilitating output of an indication of the at least one verified target detection region.

36. A non-transitory computer readable storage medium tangibly embodying a program of instructions that, when executed by a computer, cause the computer to perform a method of verification of imaged target detection, the method being performed by a processing circuitry of the computer and comprising:
(a) receiving information indicative of at least two images of at least one object, wherein the information indicative of the at least two images comprises at least one candidate damage region, the at least one candidate target detection region indicative of possible detection of a target of interest is associated with the at least one object, wherein the at least two images have at least partial overlap, constituting an overlap area, wherein the at least one candidate target detection region appears at least partially in the overlap area,
wherein the at least two images are associated with different relative positions of at least one capturing imaging device associated with the at least two images and of an imaged portion of the object;
(b) processing the information indicative of the at least two images to determine whether the at least one candidate target detection region meets at least one detection repetition criterion, the at least one detection repetition criterion being indicative of repetition of the at least one candidate target detection region in locations of the at least two images that are associated with a same location on a data representation of the at least one object; and
(c) in response to the at least one detection repetition criterion being met, classifying the at least one candidate target detection region as at least one verified target detection region,
thereby facilitating output of an indication of the at least one verified target detection region.

37. A computer-implemented method of imaged target detection and detection verification, the method performed by a multiple-image-input single-frame imaged target detection system, the method comprising, using a processing circuitry of the multiple input single-frame imaged target detection system to perform the following:
1) receive, via at least two image inputs of the multiple-image-input single-frame target detection system, at least two images of at least one object, wherein the at least two images have at least partial overlap,
wherein the at least two images are associated with different relative positions of at least one capturing imaging device associated with the at least two images and an imaged portion of the object associated with the at least two images;
2) process the at least two images, to detect at least one target detection region, the at least one target detection damage region indicative of detection of a target of interest associated with the at least one object, wherein the at least one target detection region is associated with a detection image of the at least two images, wherein the at least one target detection region appears at least partially in an area of the detection image that is associated with the at least partial overlap;

3) receive information indicative of the at least two images of the at least one object, wherein the information indicative of the at least two images comprises the at least one target detection region, wherein the at least two images have at least partial overlap, constituting an overlap area, wherein the at least one target detection region appears at least partially in the overlap area, wherein the at least two images are associated with different relative positions of at least one capturing imaging device associated with the at least two images and of an imaged portion of the object associated with the at least two images;

4) process the information indicative of the at least two images to determine whether the at least one target detection region meets at least one detection repetition criterion, the at least one detection repetition criterion being indicative of repetition of the at least one target detection region in locations of the at least two images that are associated with a same location on a data representation of the at least one object; and 5) in response to the at least one detection repetition criterion being met, classify the at least one target detection region as at least one verified target detection region, thereby facilitating output of an indication of the at least one verified target detection region.

38. A non-transitory computer readable storage medium tangibly embodying a program of instructions that, when executed by a computer, cause the computer to perform a method of imaged target detection and detection verification, the method being performed by a processing circuitry of a multiple-image-input single-frame imaged target detection system and comprising:

1) receiving, via at least two image inputs of the multiple-image-input single-frame target detection system, at least two images of at least one object, wherein the at least two images have at least partial overlap, wherein the at least two images are associated with different relative positions of at least one capturing imaging device associated with the at least two images and an imaged portion of the object associated with the at least two images; and 2) processing the at least two images, to detect at least one target detection region, the at least one target detection region indicative of detection of a target of interest associated with the at least one object, wherein the at least one target detection region is associated with a detection image of the at least two images, wherein the at least one target detection region appears at least partially in an area of the detection image that is associated with the at least partial overlap;

3) receive information indicative of the at least two images of the at least one object, wherein the information indicative of the at least two images comprises the at least one target detection region, wherein the at least two images have at least partial overlap, constituting an overlap area, wherein the at least one target detection region appears at least partially in the overlap area, wherein the at least two images are associated with different relative positions of at least one capturing imaging device associated with the at least two images and of an imaged portion of the object associated with the at least two images;

4) process the information indicative of the at least two images to determine whether the at least one target detection region meets at least one detection repetition criterion, the at least one detection repetition criterion being indicative of repetition of the at least one target detection region in locations of the at least two images that are associated with a same location on a data representation of the at least one object; and 5) in response to the at least one detection repetition criterion being met, classify the at least one target detection region as at least one verified target detection region, thereby facilitating output of an indication of the at least one verified target detection region.

* * * * *